(12) United States Patent
Okumura

(10) Patent No.: US 9,888,201 B2
(45) Date of Patent: Feb. 6, 2018

(54) IMAGE PROCESSING APPARATUS, IMAGE PROCESSING METHOD AND MANUFACTURING APPARATUS

(71) Applicant: Sony Corporation, Tokyo (JP)

(72) Inventor: Kenichi Okumura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/612,637

(22) Filed: Jun. 2, 2017

(65) Prior Publication Data

US 2017/0272676 A1   Sep. 21, 2017

Related U.S. Application Data

(63) Continuation of application No. 14/636,445, filed on Mar. 3, 2015, now Pat. No. 9,706,149, which is a continuation of application No. 14/045,650, filed on Oct. 3, 2013, now Pat. No. 9,001,239, which is a continuation of application No. 12/487,149, filed on Jun. 18, 2009, now Pat. No. 8,576,311.

(30) Foreign Application Priority Data

Jun. 20, 2008   (JP) ................................ 2008-161273

(51) Int. Cl.
*H04N 9/083*   (2006.01)
*H04N 3/14*   (2006.01)
*H04N 5/335*   (2011.01)
*H04N 9/04*   (2006.01)
*H04N 5/378*   (2011.01)
*H04N 5/3745*   (2011.01)

(52) U.S. Cl.
CPC ......... *H04N 5/378* (2013.01); *H04N 5/37457* (2013.01); *H04N 9/045* (2013.01)

(58) Field of Classification Search
USPC ......................................... 348/273, 280, 281
See application file for complete search history.

(56) References Cited

U.S. PATENT DOCUMENTS

2011/0128424 A1*   6/2011   Yamashita ............. H04N 5/353
                                                                    348/296
2012/0113290 A1*   5/2012   Nakata ............... H04N 5/35554
                                                                    348/222.1

* cited by examiner

*Primary Examiner* — Anthony J Daniels
(74) *Attorney, Agent, or Firm* — Sheridan Ross P.C.

(57) ABSTRACT

An image processing apparatus having a plurality of Bayer arrays each including 4 pixels sharing a common electrode connected to a vertical signal line wherein: each of the pixels has a pixel electrode connected to a horizontal signal line; and the location of each of the horizontal signal lines and the location of each of the pixel electrodes each connected to one of the horizontal signal lines are determined so that the locations in a neighboring Bayer array are a mirror image of counterpart locations in another Bayer array adjacent to the neighboring Bayer array.

18 Claims, 18 Drawing Sheets

IMAGE PROCESSING APPARATUS, IMAGE PROCESSING METHOD AND MANUFACTURING APPARATUS

CROSS-REFERENCE TO RELATED APPLICATIONS

This application is a continuation of U.S. patent application Ser. No. 14/636,445, filed Mar. 3, 2015, which is a continuation of U.S. patent application Ser. No. 14/045,650, filed Oct. 3, 2013, now U.S. Pat. No. 9,001,239, which is a continuation of U.S. patent application Ser. No. 12/487,149, filed Jun. 18, 2009, now U.S. Pat. No. 8,576,311, which claims priority to Japanese Patent Application Serial No. JP 2008-161273, filed in the Japan Patent Office on Jun. 20, 2008, the entire disclosures of which are hereby incorporated herein by reference.

BACKGROUND OF THE INVENTION

1. Field of the Invention

In general, the present invention relates to an image processing apparatus, an image processing method and a device manufacturing apparatus. More particularly, the present invention relates to an image processing apparatus which is capable of improving sensitivity deteriorations caused by the increasing number of pixels created on the display screen of the apparatus as pixels each having a small size and capable of increasing a speed when video is recording. The present invention also relates to an image processing method adopted by the image processing apparatus and relates to a manufacturing apparatus for manufacturing the image processing apparatus.

2. Description of the Related Art

Image taking apparatus such as a video camera include an apparatus which is capable of taking not only a moving image but also a static image. In an image taking apparatus provided with both a moving-image taking mode for taking a moving image and a static-image taking mode for taking a static image, when an image is taken in the static-image taking mode, signals are read out from all pixels provided on the display screen. When an image is taken in the moving-image taking mode, on the other hand, data is read out from predetermined pixels provided on the display screen in the so-called thinned-out read operation.

When an image is taken in the moving-image taking mode, the image processing apparatus adopts a frame-rate increasing method by which the thinned-out read operation is carried out, undesirably sacrificing pixel information displayed on the screen to a certain degree. Technologies underlying the method for increasing the frame rate are studied. The technologies include a technology underlying a method for increasing the speed at which pixel signals are read out and for carrying out the thinned-out read operation by devising the layout of wires and image taking devices. The technologies also include a technology underlying a method for optimally adjusting the sensitivity and the dynamic range.

Japanese Patent Laid-open No. 2006-319407 (hereinafter referred to as Patent Document 1) discloses an image taking apparatus which is switched from an all-pixel read mode to a thinned-out read mode and vice versa. Patent Document 1 shows the configuration of an image taking apparatus like one shown in a diagram of FIG. 1.

To put it in detail, the FIG. 1 is a circuit diagram showing R (Red) pixels, G (Green) pixels and B (Blue) pixels placed along the first to fourth rows and along the first and sixteenth columns. The figure also shows states of connections between the pixels and a first horizontal signal line group 15D and between the pixels and a second horizontal signal line group 15U. It is to be noted that, even though the following description explains only R (Red) pixels, G (Green) pixels and B (Blue) pixels placed along the first to fourth rows and along the first and sixteenth columns, the configurations of R (Red) pixels, G (Green) pixels and B (Blue) pixels placed along other rows and along other columns are the same as the pixels explained in the following description.

The first horizontal signal line group 15D is configured to include four horizontal signal lines, i.e., horizontal signal lines 15D1 to 15D4. By the same token, the second horizontal signal line group 15U is configured to include four horizontal signal lines, i.e., horizontal signal lines 15U1 to 15U4.

An R pixel 20 (1, 1) is placed at the intersection of the first row and the first column whereas a G pixel 20 (1, 2) is placed at the intersection of the first row and the second column. In this way, at the intersections of the first row and the third to sixteenth columns, R and G pixels are arranged alternately. By the same token, an R pixel 20 (3, 1) is placed at the intersection of the third row and the first column whereas a G pixel 20 (3, 2) is placed at the intersection of the third row and the second column. In this way, at the intersections of the third row and the third to sixteenth columns, R and G pixels are arranged alternately.

A G pixel 20 (2, 1) is placed at the intersection of the second row and the first column whereas a B pixel 20 (2, 2) is placed at the intersection of the second row and the second column. In this way, at the intersections of the second row and the third to sixteenth columns, G and B pixels are arranged alternately. By the same token, a G pixel 20 (4, 1) is placed at the intersection of the fourth row and the first column whereas a B pixel 20 (4, 2) is placed at the intersection of the fourth row and the second column. In this way, at the intersections of the fourth row and the third to sixteenth columns, G and B pixels are arranged alternately.

The first vertical signal line 17D (1) laid along the first column is connected to the R pixel 20 (1, 1) placed at the intersection of the first row and the first column as well as the R pixel 20 (3, 1) placed at the intersection of the third row and the first column. By the same token, any odd-numbered first vertical signal line 17D laid along an odd-numbered column is connected to the R pixel placed at the intersection of the first row and the odd-numbered column as well as the R pixel placed at the intersection of the third row and the odd-numbered column. For example, the first vertical signal line 17D (15) laid along the fifteenth column is connected to the R pixel 20 (1, 15) placed at the intersection of the first row and the fifteenth column as well as the R pixel 20 (3, 15) placed at the intersection of the third row and the fifteenth column.

The second vertical signal line 17U (1) laid along the first column is connected to the G pixel 20 (2, 1) placed at the intersection of the second row and the first column as well as the G pixel 20 (4, 1) placed at the intersection of the fourth row and the first column. By the same token, any odd-numbered second vertical signal line 17U laid along an odd-numbered column is connected to the G pixel placed at the intersection of the second row and the odd-numbered column as well as the G pixel placed at the intersection of the fourth row and the odd-numbered column. For example, the second vertical signal line 17U (15) laid along the fifteenth column is connected to the G pixel 20 (2, 15) placed at the intersection of the second row and the fifteenth column as well as the G pixel 20 (4, 15) placed at the intersection of the fourth row and the fifteenth column.

The first vertical signal line 17D (2) laid along the second column is connected to the B pixel 20 (2, 2) placed at the intersection of the second row and the second column as well as the B pixel 20 (4, 2) placed at the intersection of the fourth row and the second column. By the same token, any even-numbered first vertical signal line 17D laid along an even-numbered column is connected to the B pixel placed at the intersection of the second row and the even-numbered column as well as the B pixel placed at the intersection of the fourth row and the even-numbered column. For example, the first vertical signal line 17D (16) laid along the sixteenth column is connected to the B pixel 20 (2, 16) placed at the intersection of the second row and the sixteenth column as well as the B pixel 20 (4, 16) placed at the intersection of the fourth row and the sixteenth column.

The second vertical signal line 17U (2) laid along the second column is connected to the G pixel 20 (1, 2) placed at the intersection of the first row and the second column as well as the G pixel 20 (3, 2) placed at the intersection of the third row and the second column. By the same token, any even-numbered second vertical signal line 17U laid along an even-numbered column is connected to the G pixel placed at the intersection of the first row and the even-numbered column as well as the G pixel placed at the intersection of the third row and the even-numbered column. For example, the second vertical signal line 17U (16) laid along the sixteenth column is connected to the G pixel 20 (1, 16) placed at the intersection of the first row and the sixteenth column as well as the G pixel 20 (3, 16) placed at the intersection of the third row and the sixteenth column.

The first vertical signal lines 17D (1), 17D (2), 17D (15) and 17D (16) laid along the first, second, fifteenth and sixteenth columns respectively are connected to a horizontal signal line 15D1. The first vertical signal lines 17D (3), 17D (4), 17D (13) and 17D (14) laid along the third, fourth, thirteenth and fourteenth columns respectively are connected to a horizontal signal line 15D2. The first vertical signal lines 17D (5), 17D (6), 17D (11) and 17D (12) laid along the fifth, sixth, eleventh and twelfth columns respectively are connected to a horizontal signal line 15D3. The first vertical signal lines 17D (7), 17D (8), 17D (9) and 17D (10) laid along the seventh, eighth, ninth and tenth columns respectively are connected to a horizontal signal line 15D4.

It is to be noted that the first vertical signal lines 17D (1) to 17D (16) provided for the columns are connected to the horizontal signal lines 15D1 to 15D4 by a CDS (Correlated Double Sampling)/SH (Sample Hold) circuit and column select switches. However, the CDS/SH circuit and the column select switches are not shown in the diagram of FIG. 1.

The second vertical signal lines 17U (1), 17U (2), 17U (15) and 17U (16) laid along the first, second, fifteenth and sixteenth columns respectively are connected to a horizontal signal line 15U1. The second vertical signal lines 17U (3), 17U (4), 17U (13) and 17U (14) laid along the third, fourth, thirteenth and fourteenth columns respectively are connected to a horizontal signal line 15U2. The second vertical signal lines 17U (5), 17U (6), 17U (11) and 17U (12) laid along the fifth, sixth, eleventh and twelfth columns respectively are connected to a horizontal signal line 15U3. The second vertical signal lines 17U (7), 17U (8), 17U (9) and 17U (10) laid along the seventh, eighth, ninth and tenth columns respectively are connected to a horizontal signal line 15U4.

It is to be noted that the second vertical signal lines 17U (1) to 17U (16) provided for the columns are connected to the horizontal signal lines 15U1 to 15U4 by a CDS/SH circuit and column select switches. However, the CDS/SH circuit and the column select switches are not shown in the diagram of FIG. 1.

In each of portions above and below a pixel area of the Bayer array CMOS (Complementary Metal Oxide Semiconductor) image sensor adopting a column CDS method as is the case with one shown in the diagram of FIG. 1, a CDS/SH processing section, a column select switch sections and four horizontal signal lines are provided. If necessary, each of the column select portions is switched to select columns. By switching the column select portions, the read operation can be carried out in each of an all-pixel read mode, a ½ thinned-out read mode and ¼ thinned-out read mode. That is to say, output processing can be carried out in a thinned-out read mode.

The configuration of another existing image taking apparatus is explained by referring to a diagram of FIG. 2. Much like the image sensor employed in the existing image taking apparatus shown in the diagram of FIG. 1, an image sensor 50 employed in the other existing image taking apparatus shown in the diagram of FIG. 2 is a CMOS image sensor of a column CDS Bayer array system. The image sensor 50 employed in the other existing image taking apparatus shown in the diagram of FIG. 2 is described in Japanese Patent Laid-open No. 2007-124137. The image sensor 50 shown in the diagram of FIG. 2 employs a pixel array section 51, left and right V decoders (or vertical scan circuits) 52-1 and 52-2, upper and lower H decoders (or horizontal scan circuits) 53-1 and 53-2, upper and lower CDS circuits 54-1 and 54-2, upper and lower horizontal select transistors 55-1 and 55-2, upper and lower horizontal signal lines 56-1 and 56-2, vertical signal lines 57-1 and 57-2 as well as vertical select lines 58-1 and 58-2.

The pixel array section 51 has a first pixel group composed of a plurality of pixels 59-1 laid out 2-dimensionally to form a pixel matrix and a second pixel group composed of a plurality of pixels 59-2 laid out 2-dimensionally to form a pixel matrix. Each of the pixels 59-1 and 59-2 employed in the pixel array section 51 has the configuration of a rectangular pixel employed in the image sensor shown in the diagram of FIG. 1 except that the pixels 59-1 and 59-2 are laid out in an inclined direction forming an angle of 45 degrees in conjunction with the vertical or horizontal direction. In this layout, pixels arranged on any specific pixel row are separated away from pixels arranged on a row adjacent to the specific pixel row by a distance equal to half the size of a pixel. By the same token, pixels arranged on any specific pixel column are separated away from pixels arranged on a column adjacent to the specific pixel column by a distance equal to half the size of a pixel. That is to say, the pixels 59-1 composing the first pixel group are separated away from the pixels 59-2 composing the second pixel group in both the horizontal and vertical directions by a distance equal to half the size of a pixel. Each of the pixels 59-1 and 59-2 includes a pixel circuit, and a color filter is set for each of the pixels 59-1 and 59-2.

A color matrix of a Bayer array is created on each of the first and second pixel group. The Bayer array has a typical 2×2 RGBG configuration. In the sequence RGBG, notation R denotes a red-color filter, notation G denotes a green-color filter and notation B denotes a blue-color filter. In the image sensor 50 shown in the diagram of FIG. 2, the Bayer array on the first pixel group is referred to as Bayer array 1 whereas the Bayer array on the second pixel group is referred to as Bayer array 2.

As shown in the diagram of FIG. 2, the 2×2 color matrix of the first pixel group overlaps the 2×2 color matrix of the second pixel group. The V decoder 52-1 selects pixels 59-1 of the first pixel group in the pixel array section 51 through the vertical select line 58-1 in row units. The selection process is carried out sequentially on a row-after-row basis starting from the bottom end, and pixel signals are read out simultaneously as a batch from each row. The CDS circuit 54-1 carries out a correlation double sampling process on the pixel signals, which are read out from the first pixel group of the pixel array section 51 in row units, in order to reduce reset noises.

In this case, an electric potential of a 0-level period following a reset period of the pixel signal is clamped to an electric potential determined in advance by making use of a clamp pulse. Then, a signal period of the pixel signal is sampled and held by making use of a sample-hold pulse S/H (Sample/Hold) in order to obtain a pixel signal having fewer reset noises. The H decoder 53-1 selects a pixel signal from pixel signals output by the CDS circuit 54-1 for 1 row sequentially, starting from the left end on a pixel-after-pixel basis. The transistor 55-1 for horizontal selection serves as a horizontal output circuit. In this case, a transistor 55-1 provided at a location selected by the H decoder 53-1 is put in a turned-on state, outputting the pixel signal sampled and held by the CDS circuit 54-1 to the horizontal signal line 56-1. The pixel signals sequentially output to the horizontal signal line 56-1 in this way form a first image signal HL1.

The first image signal HL1 obtained from the first pixel group is amplified by a later-stage amplifier not shown in the diagram of FIG. 2 and is then output to a recipient outside the image sensor. In addition, the V decoder 52-2 selects pixels 59-2 of the second pixel group of the pixel array section 51 through the vertical select line 58-2 in row units. The selection process is carried out sequentially on a row-after-row basis starting from the bottom end, and pixel signals are read out simultaneously as a batch from each row. The CDS circuit 54-2 carries out a correlation double sampling process on the pixel signals, which are read out from the second pixel group of the pixel array section 51 in row units, in order to reduce reset noises. The H decoder 53-2 selects a pixel signal from pixel signals output by the CDS circuit 54-2 for 1 row sequentially, starting from the left end on a pixel-after-pixel basis.

The transistor 55-2 for horizontal selection serves as a horizontal output circuit. In this case, a transistor 55-2 provided at a location selected by the H decoder 53-2 is put in a turned-on state, outputting the pixel signal sample-held by the CDS circuit 54-2 to the horizontal signal line 56-2. The pixel signals sequentially output to the horizontal signal line 56-2 in this way form a second image signal HL2. The second image signal HL2 obtained from the second pixel group is amplified by a later-stage amplifier not shown in the diagram of FIG. 2 and is then output to a recipient outside the image sensor.

Next, the pixel circuit of every pixel 59-1 and every pixel 59-2 is explained. FIG. 3 is a diagram showing the pixel circuits. Each of the pixel circuits is configured to employ a photodiode PD, a transfer transistor T1, a reset transistor T2, an amplification transistor T3 and a select transistor T4. The photodiode PD is an element provided with an opto-electrical conversion function and an electrical-charge accumulation function. The anode of the photodiode PD is connected to the ground. The photodiode PD carries out a conversion process to convert incident light into an electrical charge having a magnitude representing the quantity of the light and accumulates the electrical charge obtained as a result of the conversion process. The transfer transistor T1 is connected between the cathode of the photodiode PD and a floating diffusion section FD. The transfer transistor T1 transfers the electrical charge generated by the photodiode PD to the floating diffusion section FD with a timing determined by a transfer pulse TRS applied to the gate of the transfer transistor T1.

The reset transistor T2 is connected between a power supply and the floating diffusion section FD. The reset transistor T2 resets the electric potential of the floating diffusion section FD to the electric potential of the power supply with a timing determined by a reset pulse RST applied to the gate of the reset transistor T2. The floating diffusion section FD is also connected to the gate of the amplification transistor T3. The amplification transistor T3 is connected to the vertical signal lines 57-1 and 57-2 by the select transistor T4. When the select transistor T4 is put in a turned-on state on the basis of a pixel select signal SEL, the amplification transistor T3 asserts a voltage according to an electric potential, which is obtained as a result of amplifying the electric potential appearing on the floating diffusion section FD, on the vertical signal lines 57-1 and 57-2.

The image sensor 50 shown in the diagram of FIG. 2 has pixels of the first and second pixel groups separated from each other in both the horizontal and vertical directions by a distance equal to half the size of a pixel. The image sensor 50 executes control so that the electrical-charge accumulation time for the first pixel group is different from the electrical-charge accumulation time for the second pixel group. Then, image signals obtained from the first and second pixel groups are synthesized to produce an output image signal. As a result, it is possible to easily obtain sensitivity and a dynamic range which are optimum for the image.

SUMMARY OF THE INVENTION

In recent years, the size of a video camera has been becoming smaller and smaller. In addition, an image sensor is mounted in a cellular phone besides image taking apparatus such as a video camera. In such applications, an image sensor having a small size is also desirable. If the size of the image sensor is reduced, however, the dimensions of every pixel employed in the image sensor must also be decreased. As a result, it is quite within the bounds of possibility that the sensitivity of the image sensor deteriorates. In addition, it is also quite within the bounds of possibility that the processing speed can hardly be raised if the thinned-out operation described previously is carried out to take a moving image.

In order to solve the problems described above, in the Bayer array, the image sensor having a shared pixel structure is provided with a portion shown in a diagram of FIG. 3. FIG. 4 is a diagram showing the circuit of the image sensor shown in FIG. 3. In the image sensor shown in the diagrams of FIGS. 3 and 4, an R pixel 100 (1, 1), a G pixel 100 (1, 2), a G pixel 100 (2, 1) and a B pixel 100 (2, 2) compose a Bayer array 101-1. The Bayer array 101-1 is provided with a common electrode 102-1 to serve as a shared electrode common to the R pixel 100 (1, 1), the G pixel 100 (1, 2), the G pixel 100 (2, 1) and the B pixel 100 (2, 2). The common electrode 102-1 is connected to a vertical signal line 103-1.

By the same token, an R pixel 100 (1, 3), a G pixel 100 (1, 4), a G pixel 100 (2, 3) and a B pixel 100 (2, 4) compose a Bayer array 101-2. The Bayer array 101-2 is provided with a common electrode 102-2 to serve as a shared electrode common to the R pixel 100 (1, 3), the G pixel 100 (1, 4), the G pixel 100 (2, 3) and the B pixel 100 (2, 4). The common electrode 102-2 is connected to a vertical signal line 103-2.

In the same way, an R pixel 100 (1, 5), a G pixel 100 (1, 6), a G pixel 100 (2, 5) and a B pixel 100 (2, 6) compose a Bayer array 101-3. The Bayer array 101-3 is provided with a common electrode 102-3 to serve as a shared electrode common to the R pixel 100 (1, 5), the G pixel 100 (1, 6), the G pixel 100 (2, 5) and the B pixel 100 (2, 6). The common electrode 102-3 is connected to a vertical signal line 103-3.

Likewise, an R pixel 100 (1, 7), a G pixel 100 (1, 8), a G pixel 100 (2, 7) and a B pixel 100 (2, 8) compose a Bayer array 101-4. The Bayer array 101-4 is provided with a common electrode 102-4 to serve as a shared electrode common to the R pixel 100 (1, 7), the G pixel 100 (1, 8), the G pixel 100 (2, 7) and the B pixel 100 (2, 8). The common electrode 102-4 is connected to a vertical signal line 103-4.

In addition, every pixel 100 is provided with a pixel electrode connected to one of the horizontal signal lines 104-1 to 104-4. To put it more concretely, the R pixel 100 (1, 1) is provided with a pixel electrode 105-1 connected to the horizontal signal line 104-1 whereas the G pixel 100 (1, 2) is provided with a pixel electrode 105-2 connected to the horizontal signal line 104-2. On the other hand, the R pixel 100 (1, 3) is provided with a pixel electrode 105-3 connected to the horizontal signal line 104-1 whereas the G pixel 100 (1, 4) is provided with a pixel electrode 105-4 connected to the horizontal signal line 104-2.

In addition, the R pixel 100 (1, 5) is provided with a pixel electrode 105-5 connected to the horizontal signal line 104-1 whereas the G pixel 100 (1, 6) is provided with a pixel electrode 105-6 connected to the horizontal signal line 104-2. On the other hand, the R pixel 100 (1, 7) is provided with a pixel electrode 105-7 connected to the horizontal signal line 104-1 whereas the G pixel 100 (1, 8) is provided with a pixel electrode 105-8 connected to the horizontal signal line 104-2.

On top of that, the G pixel 100 (2, 1) is provided with a pixel electrode 106-1 connected to the horizontal signal line 104-3 whereas the B pixel 100 (2, 2) is provided with a pixel electrode 106-2 connected to the horizontal signal line 104-4. On the other hand, the G pixel 100 (2, 3) is provided with a pixel electrode 106-3 connected to the horizontal signal line 104-3 whereas the B pixel 100 (2, 4) is provided with a pixel electrode 106-4 connected to the horizontal signal line 104-4.

In addition, the G pixel 100 (2, 5) is provided with a pixel electrode 106-5 connected to the horizontal signal line 104-3 whereas the B pixel 100 (2, 6) is provided with a pixel electrode 106-6 connected to the horizontal signal line 104-4. On the other hand, the G pixel 100 (2, 7) is provided with a pixel electrode 106-7 connected to the horizontal signal line 104-3 whereas the B pixel 100 (2, 8) is provided with a pixel electrode 106-8 connected to the horizontal signal line 104-4.

On top of that, every pixel 100 is connected to a reset line 107 and a read signal line 108.

In the image sensor having such a configuration, the R pixels 100 (1, 1), 100 (1, 3), 100 (1, 5) and 100 (1, 7) laid out in the horizontal direction are selected by the horizontal signal line 104-1, and a pixel signal is read out from the vertical signal lines 103-1 to 103-4 connected to the Bayer column of each of the R pixels 100.

By the same token, the G pixels 100 (1, 2), 100 (1, 4), 100 (1, 6) and 100 (1, 8) laid out in the horizontal direction are selected by the horizontal signal line 104-2, and a pixel signal is read out from the vertical signal lines 103-1 to 103-4 connected to the Bayer column of each of the G pixels.

In the same way, the G pixels 100 (2, 1), 100 (2, 3), 100 (2, 5) and 100 (2, 7) laid out in the horizontal direction are selected by the horizontal signal line 104-3, and a pixel signal is read out from the vertical signal lines 103-1 to 103-4 connected to the Bayer column of each of the G pixels.

Likewise, the B pixels 100 (2, 2), 100 (2, 4), 100 (2, 6) and 100 (2, 8) laid out in the horizontal direction are selected by the horizontal signal line 104-4, and a pixel signal is read out from the vertical signal lines 103-1 to 103-4 connected to the Bayer column of each of the B pixels.

Explanations with reference to diagrams of FIGS. 5A and 5B are added as follows. FIG. 5A is a diagram provided for a read operation carried out in an all-pixel read mode whereas FIG. 5B is a diagram provided for a read operation carried out in a ½ thinned-out read mode. In the case of the read operation carried out in an all-pixel read mode, in order to read out a pixel signal from each of 4 pixels composing the Bayer array 101-1, it is necessary to select each of the horizontal signal lines 104-1 to 104-4 and, then, read out the pixel signals. Thus, 4 read operations need to be carried out.

In addition, also in the case of the read operation carried out in a ½ thinned-out read mode, in order to read out a pixel signal from each of 4 pixels composing the Bayer array 101-1, it is necessary to select each of the horizontal signal lines 104-1 to 104-4 and, then, read out the pixel signals. Thus, also in the case of the read operation carried out in a ½ thinned-out read mode, 4 read operations need to be carried out.

As described above, both in the case of the read operation carried out in an all-pixel read mode and in the case of the read operation carried out in a ½ thinned-out read mode, in order to read out pixel signals of 1 Bayer array (consisting of an R pixel, a G pixel, a G pixel and a B pixel), 4 read operations are demanded.

By reducing the number of operations to read out a pixel signal by selecting a horizontal signal line, a high processing speed can be conceivably realized. In addition, sensitivity deteriorations accompanying the increased number of pixels can also be conceivably improved as well.

Addressing the problems described above, inventors of the present embodiment have innovated an image processing apparatus capable of realizing a high processing speed and improving sensitivity deteriorations accompanying the increased number of pixels employed in the image processing apparatus.

In accordance with an embodiment of the present invention, there is provided an image processing apparatus having a plurality of Bayer arrays each including 4 pixels sharing a common electrode which is connected to a vertical signal line. Each of the pixels has a pixel electrode which is connected to a horizontal signal line. The location of each of the horizontal signal lines and the location of each of the pixel electrodes each connected to one of the horizontal signal lines are determined so that the locations in a neighboring Bayer array are a mirror image of the counterpart locations in another Bayer array adjacent to the neighboring Bayer array.

In addition, it is also possible to provide a configuration in which, if the pixel electrode of a neighboring pixel included in a neighboring Bayer array is placed on the upper side in the neighboring pixel, the pixel electrode of another pixel included in another Bayer array adjacent to the neighboring Bayer array in the horizontal direction is also placed on the upper side in the other pixel. If the pixel electrode of such a neighboring pixel is placed on the lower side in the neighboring pixel, on the other hand, the pixel electrode of such another pixel is also placed on the lower side in the other pixel.

In addition, it is also possible to provide a configuration in which the pixel electrode of the neighboring pixel and the pixel electrode of the other pixel are connected to each other by the same one of the horizontal signal lines.

In addition, it is also possible to provide a configuration in which a pixel signal is read out from any neighboring one of the pixels by properly selecting a horizontal signal line.

In addition, it is also possible to provide a configuration in which:

a pixel located on the left lower side in the Bayer array to serve as one of the 4 pixels pertaining to the Bayer array is used as the first pixel;

a pixel located on the right lower side in the Bayer array to serve as one of the 4 pixels pertaining to the Bayer array is used as the second pixel;

a pixel located on the left upper side in the Bayer array to serve as one of the 4 pixels pertaining to the Bayer array is used as the third pixel;

a pixel located on the right upper side in the Bayer array to serve as one of the 4 pixels pertaining to the Bayer array is used as the fourth pixel;

each of the horizontal signal lines is stretched in a horizontal direction referred to as the direction of every row;

each of the vertical signal lines is stretched in a vertical direction referred to as the direction of every column;

the first pixel of a Bayer array denoted by a notation including an odd column number and the second pixel of a Bayer array denoted by a notation including an even column number are connected to each other by a first horizontal signal line;

the second pixel of a Bayer array denoted by a notation including an odd column number and the first pixel of a Bayer array denoted by a notation including an even column number are connected to each other by a second horizontal signal line;

the third pixel of a Bayer array denoted by a notation including an odd column number and the fourth pixel of a Bayer array denoted by a notation including an even column number are connected to each other by a third horizontal signal line; and the fourth pixel of a Bayer array denoted by a notation including an odd column number and the third pixel of a Bayer array denoted by a notation including an even column number are connected to each other by a fourth horizontal signal line.

In addition, it is also possible to provide a configuration in which pixel signals are read out from the pixels by selecting the first horizontal signal line for a Bayer array denoted by a notation including an odd column number and selecting the third horizontal signal line for a Bayer array denoted by a notation including an even column number.

In addition, it is also possible to provide a configuration in which pixel signals are read out from the pixels by selecting the second horizontal signal line for a Bayer array denoted by a notation including an odd column number and selecting the fourth horizontal signal line for a Bayer array denoted by a notation including an even column number.

In addition, it is also possible to provide a configuration in which pixel signals are read out from the pixels by selecting the third horizontal signal line for a Bayer array denoted by a notation including an odd column number and selecting the first horizontal signal line for a Bayer array denoted by a notation including an even column number.

In addition, it is also possible to provide a configuration in which pixel signals are read out from the pixels by selecting the third horizontal signal line for a Bayer array denoted by a notation including an odd column number and selecting the first horizontal signal line for a Bayer array denoted by a notation including an even column number and, then, pixel signals are read out from the pixels by selecting the second horizontal signal line for a Bayer array denoted by a notation including an odd column number and selecting the fourth horizontal signal line for a Bayer array denoted by a notation including an even column number.

In addition, it is also possible to provide a configuration in which:

the 4 pixels composing the Bayer array is an R pixel, a G1 pixel, a G2 pixel and a B pixel;

each of the horizontal signal lines is stretched in a horizontal direction referred to as the direction of every row;

each of the vertical signal lines is stretched in a vertical direction referred to as the direction of every column;

the R pixel of a Bayer array denoted by a notation including an odd column number and the G1 pixel of a Bayer array denoted by a notation including an even column number are connected to each other by a first horizontal signal line;

the G1 pixel of a Bayer array denoted by a notation including an odd column number and the R pixel of a Bayer array denoted by a notation including an even column number are connected to each other by a second horizontal signal line;

the G2 pixel of a Bayer array denoted by a notation including an odd column number and the B pixel of a Bayer array denoted by a notation including an even column number are connected to each other by a third horizontal signal line; and the B pixel of a Bayer array denoted by a notation including an odd column number and the G2 pixel of a Bayer array denoted by a notation including an even column number are connected to each other by a fourth horizontal signal line.

In addition, it is also possible to provide a configuration in which, if the pixel electrode of a neighboring pixel included in a neighboring Bayer array is placed on the upper side in the neighboring pixel, the pixel electrode of another pixel included in another Bayer array adjacent to the neighboring Bayer array in the vertical direction is placed on the lower side in the other pixel. If the pixel electrode of the neighboring pixel is placed on the lower side in the neighboring pixel, on the other hand, the pixel electrode of the other pixel is placed on the upper side in the other pixel.

In addition, it is also possible to provide a configuration in which:

a pixel located on the left lower side in the Bayer array to serve as one of the 4 pixels pertaining to the Bayer array is used as the first pixel;

a pixel located on the right lower side in the Bayer array to serve as one of the 4 pixels pertaining to the Bayer array is used as the second pixel;

a pixel located on the left upper side in the Bayer array to serve as one of the 4 pixels pertaining to the Bayer array is used as the third pixel;

a pixel located on the right upper side in the Bayer array to serve as one of the 4 pixels pertaining to the Bayer array is used as the fourth pixel;

each of the horizontal signal lines is stretched in a horizontal direction referred to as the direction of every row;

each of the vertical signal lines is stretched in a vertical direction referred to as the direction of every column;

the first pixel of a Bayer array denoted by a notation including an odd column number and the first pixel of a Bayer array denoted by a notation including an even column number are connected to each other by a first horizontal signal line;

the second pixel of a Bayer array denoted by a notation including an odd column number and the second pixel of a Bayer array denoted by a notation including an even column number are connected to each other by a second horizontal signal line;

the third pixel of a Bayer array denoted by a notation including an odd column number and the third pixel of a Bayer array denoted by a notation including an even column number are connected to each other by a third horizontal signal line;

the fourth pixel of a Bayer array denoted by a notation including an odd column number and the fourth pixel of a Bayer array denoted by a notation including an even column number are connected to each other by a fourth horizontal signal line; and a Bayer array denoted by a notation including an even row number is placed at a location shifted away from a Bayer array denoted by a notation including an odd row number by a distance equal to ½ the size of each Bayer array.

In addition, it is also possible to provide a configuration in which pixel signals are read out from the pixels by selecting the fourth horizontal signal line for a Bayer array denoted by a notation including an odd column number and selecting the second horizontal signal line for a Bayer array denoted by a notation including an even column number and pixel signals are read out from the pixels by selecting the third horizontal signal line for a Bayer array denoted by a notation including an odd column number and selecting the first horizontal signal line for a Bayer array denoted by a notation including an even column number.

In addition, it is also possible to provide a configuration in which:

the 4 pixels composing the Bayer array is an R pixel, a G1 pixel, a G2 pixel and a B pixel;

each of the horizontal signal lines is stretched in a horizontal direction referred to as the direction of every row;

each of the vertical signal lines is stretched in a vertical direction referred to as the direction of every column;

the R pixel of a Bayer array denoted by a notation including an odd column number and the R pixel of a Bayer array denoted by a notation including an even column number are connected to each other by a first horizontal signal line;

the G1 pixel of a Bayer array denoted by a notation including an odd column number and the G1 pixel of a Bayer array denoted by a notation including an even column number are connected to each other by a second horizontal signal line;

the G2 pixel of a Bayer array denoted by a notation including an odd column number and the G2 pixel of a Bayer array denoted by a notation including an even column number are connected to each other by a third horizontal signal line;

the B pixel of a Bayer array denoted by a notation including an odd column number and the B pixel of a Bayer array denoted by a notation including an even column number are connected to each other by a fourth horizontal signal line; and a Bayer array denoted by a notation including an even row number is placed at a location shifted away from a Bayer array denoted by a notation including an odd row number by a distance equal to ½ the size of each Bayer array.

In accordance with another embodiment of the present invention, there is provided an image processing method for an image processing apparatus having a plurality of Bayer arrays each including 4 pixels sharing a common electrode which is connected to a vertical signal line. Each of the pixels has a pixel electrode which is connected to a horizontal signal line. The location of each of the horizontal signal lines and the location of each of the pixel electrodes each connected to one of the horizontal signal lines are determined so that the locations in a neighboring Bayer array are a mirror image of the counterpart locations in another Bayer array adjacent to the neighboring Bayer array. In accordance with the image processing method, a pixel signal is read out from a neighboring one of the pixels by properly selecting a horizontal signal line connected to the neighboring pixel from the horizontal signal lines.

As described above, in the image processing apparatus according to an embodiment of the present invention and the image processing method according to the other embodiment of the present invention:

a plurality of Bayer arrays each include 4 pixels sharing a common electrode which is connected to a vertical signal line;

each of the pixels has a pixel electrode which is connected to a horizontal signal line;

the location of each of the horizontal signal lines and the location of each of the pixel electrodes each connected to one of the horizontal signal lines are determined so that the locations in a neighboring Bayer array are a mirror image of the counterpart locations in another Bayer array adjacent to the neighboring Bayer array; and a pixel signal is read out from a neighboring one of the pixels by properly selecting a horizontal signal line.

In accordance with a further embodiment of the present invention, there is provided a manufacturing apparatus for manufacturing an image processing apparatus in which:

a plurality of Bayer arrays each include 4 pixels sharing a common electrode connected to a vertical signal line;

each of the pixels has a pixel electrode connected to a horizontal signal line; and the location of each of the horizontal signal lines and the location of each of the pixel electrodes each connected to one of the horizontal signal lines are determined so that the locations in a neighboring Bayer array are a mirror image of the counterpart locations in another Bayer array adjacent to the neighboring Bayer array.

By making use of the manufacturing apparatus according to the further embodiment of the present invention, it is possible to manufacture an image processing apparatus in which:

a plurality of Bayer arrays each include 4 pixels sharing a common electrode connected to a vertical signal line;

each of the pixels has a pixel electrode connected to a horizontal signal line; and the location of each of the horizontal signal lines and the location of each of the pixel electrodes each connected to one of the horizontal signal lines are determined so that the locations in a neighboring Bayer array are a mirror image of the counterpart locations in another Bayer array adjacent to the neighboring Bayer array.

In accordance with the present embodiment, the number of operations to read out a pixel signal can be reduced. In addition, by reducing the number of operations to read out a pixel signal, the speed of the processing as a whole can be increased.

DETAILED DESCRIPTION OF THE PREFERRED EMBODIMENTS

Preferred embodiments of the present invention are explained by referring to diagrams as follows.

First Embodiment

Figure 6:
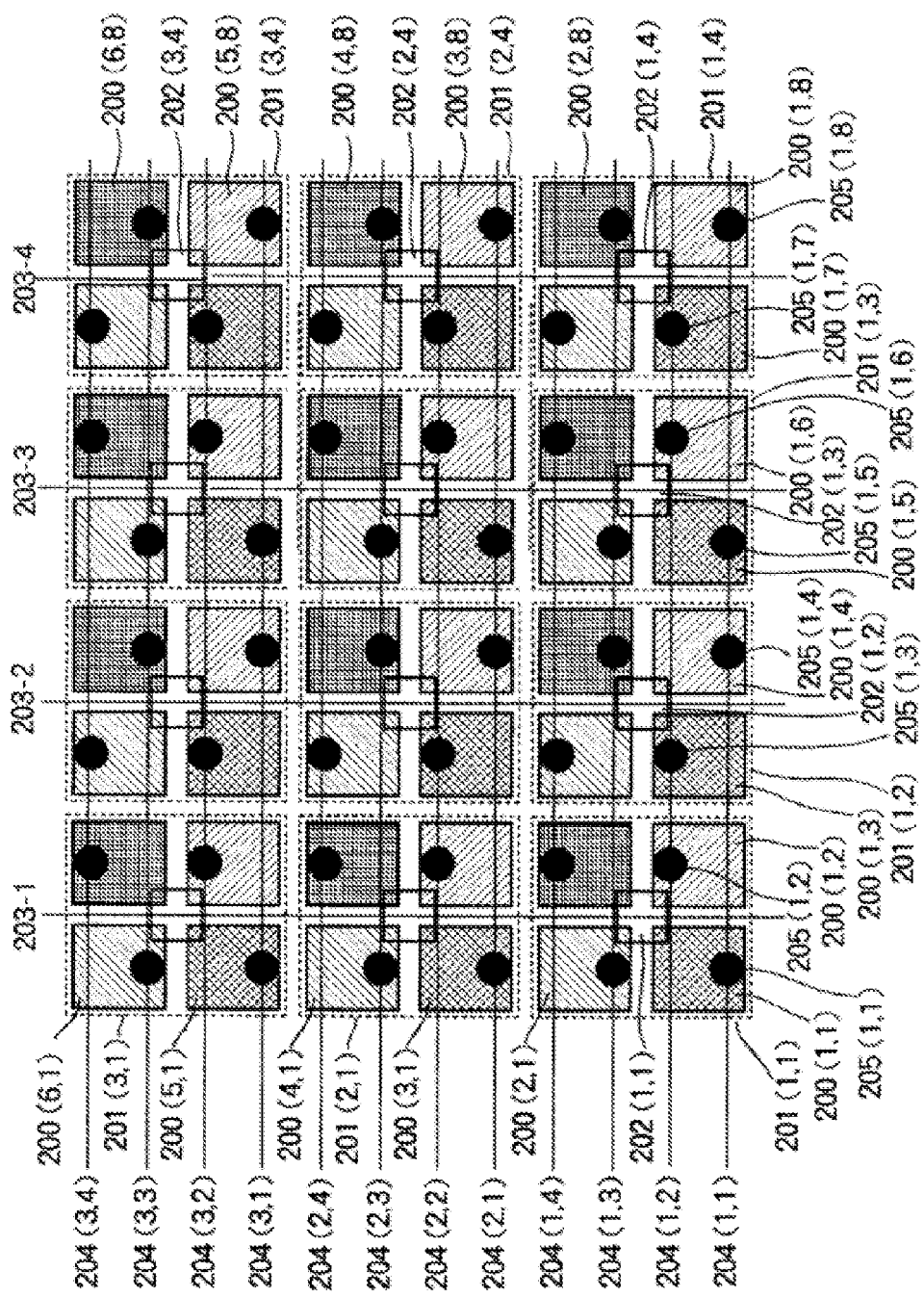
FIG. 6 is a diagram showing the configuration of an image sensor according to an embodiment of the present invention.

FIG. 6 is a diagram showing the configuration of an image processing apparatus according to a first embodiment of the present invention. Since the image processing apparatus provided by the present embodiment can be applied to the image sensor, in the following description, it is assumed that the present embodiment is applied to the image sensor which is taken as a typical example of the application of the present embodiment.

The image sensor shown in the diagram of FIG. 6 employs R (Red), G (Green) and B (Blue) pixels laid out and connected to each other to form a pixel matrix composed of first to sixth rows and first to eighth columns. What is shown in the diagram of FIG. 6 is a portion of the image sensor. That is to say, in addition to the R (Red), G (Green) and B (Blue) pixels provided along the first to sixth rows and the first to eighth columns, the image sensor also employs R (Red), G (Green) and B (Blue) pixels provided along rows other than the first to sixth rows and along columns other than the first to eighth columns.

In the following description, reference notation 200 ($m$, $n$) denotes a pixel provided at the intersection of the mth row and the nth column. Every row is oriented in the horizontal direction, which is the direction of the horizontal signal lines. On the other hand, every column is oriented in the vertical direction, which is the direction of the vertical signal lines. For example, a pixel 200 (2, 1) is a pixel located at the intersection of the second row and the first column.

A configuration constructed in the horizontal direction is explained below. The horizontal direction, which is the direction of the rows, is a direction from the left to the right in the diagram of FIG. 6. An R pixel 200 (1, 1), a G pixel 200 (1, 2), an R pixel 200 (1, 3), a G pixel 200 (1, 4), an R pixel 200 (1, 5), a G pixel 200 (1, 6), an R pixel 200 (1, 7) and a G pixel 200 (1, 8) are laid out along the first row. By the same token, a G pixel 200 (2, 1), a B pixel 200 (2, 2), a G pixel 200 (2, 3), a B pixel 200 (2, 4), a G pixel 200 (2, 5), a B pixel 200 (2, 6), a G pixel 200 (2, 7) and a B pixel 200 (2, 8) are laid out along the second row. The pixels 200 on the first and second rows form a first row Bayer array.

A second row Bayer array is provided at a location above the first row Bayer array. In the same way as the first row Bayer array, the second row Bayer array includes an R pixel 200 (3, 1), a G pixel 200 (3, 2), an R pixel 200 (3, 3), a G pixel 200 (3, 4), an R pixel 200 (3, 5), a G pixel 200 (3, 6), an R pixel 200 (3, 7) and a G pixel 200 (3, 8) which are laid out along the first row of the second row Bayer array as well as a G pixel 200 (4, 1), a B pixel 200 (4, 2), a G pixel 200 (4, 3), a B pixel 200 (4, 4), a G pixel 200 (4, 5), a B pixel 200 (4, 6), a G pixel 200 (4, 7) and a B pixel 200 (4, 8) which are laid out along the second row of the second row Bayer array.

A third row Bayer array is provided at a location above the second row Bayer array. In the same way as the second row Bayer array, the third row Bayer array includes an R pixel 200 (5, 1), a G pixel 200 (5, 2), an R pixel 200 (5, 3), a G pixel 200 (5, 4), an R pixel 200 (5, 5), a G pixel 200 (5, 6), an R pixel 200 (5, 7) and a G pixel 200 (5, 8) which are laid out along the first row of the third row Bayer array as well as a G pixel 200 (6, 1), a B pixel 200 (6, 2), a G pixel 200 (6, 3), a B pixel 200 (6, 4), a G pixel 200 (6, 5), a B pixel 200 (6, 6), a G pixel 200 (6, 7) and a B pixel 200 (6, 8) which are laid out along the second row of the third row Bayer array.

Next, a configuration constructed in the vertical direction is explained below. The vertical direction, which is the direction of the columns, is a direction from the top to the bottom in the diagram of FIG. 6. An R pixel 200 (1, 1), a G pixel 200 (2, 1), an R pixel 200 (3, 1), a G pixel 200 (4, 1), an R pixel 200 (5, 1) and a G pixel 200 (6, 1) are laid out along the first column. By the same token, a G pixel 200 (1, 2), a B pixel 200 (2, 2), a G pixel 200 (3, 2), a B pixel 200 (4, 2), a G pixel 200 (5, 2) and a B pixel 200 (6, 2) are laid out along the second column. The pixels on the first and second columns form a first column Bayer array.

In the diagram of FIG. 6, a second column Bayer array is provided on the right-hand side of the first column Bayer array. In the same way as the first column Bayer array, the second column Bayer array includes an R pixel 200 (1, 3), a G pixel 200 (2, 3), an R pixel 200 (3, 3), a G pixel 200 (4, 3), an R pixel 200 (5, 3) and a G pixel 200 (6, 3) which are laid out along the first column of the second column Bayer array as well as a G pixel 200 (1, 4), a B pixel 200 (2, 4), a G pixel 200 (3, 4), a B pixel 200 (4, 4), a G pixel 200 (5, 4) and a B pixel 200 (6, 4) which are laid out along the second column of the second column Bayer array.

In the diagram of FIG. 6, a third column Bayer array is provided on the right-hand side of the second column Bayer array. In the same way as the second column Bayer array, the third column Bayer array includes an R pixel 200 (1, 5), a G pixel 200 (2, 5), an R pixel 200 (3, 5), a G pixel 200 (4, 5), an R pixel 200 (5, 5) and a G pixel 200 (6, 5) which are laid out along the first column of the third column Bayer array as well as a G pixel 200 (1, 6), a B pixel 200 (2, 6), a G pixel 200 (3, 6), a B pixel 200 (4, 6), a G pixel 200 (5, 6) and a B pixel 200 (6, 6) which are laid out along the second column of the third column Bayer array.

In the diagram of FIG. 6, a fourth column Bayer array is provided on the right-hand side of the third column Bayer array. In the same way as the third column Bayer array, the fourth column Bayer array includes an R pixel 200 (1, 7), a G pixel 200 (2, 7), an R pixel 200 (3, 7), a G pixel 200 (4, 7), an R pixel 200 (5, 7) and a G pixel 200 (6, 7) which are laid out along the first column of the fourth column Bayer array as well as a G pixel 200 (1, 8), a B pixel 200 (2, 8), a G pixel 200 (3, 8), a B pixel 200 (4, 8), a G pixel 200 (5, 8) and a B pixel 200 (6, 8) which are laid out along the second column of the fourth column Bayer array.

In the image sensor shown in the diagram of FIG. 6, 4 pixels share a common electrode 202 which is connected to a vertical signal line. To put it more concretely, as an example, an R pixel 200 (1, 1), a G pixel 200 (1, 2), a G pixel 200 (2, 1) and a B pixel 200 (2, 2) form a Bayer array 201 (1, 1) which is provided with a common electrode 202 (1, 1).

By the same token, an R pixel 200 (1, 3), a G pixel 200 (1, 4), a G pixel 200 (2, 3) and a B pixel 200 (2, 4) form a Bayer array 201 (1, 2) which is provided with a common electrode 202 (1, 2). In the same way, an R pixel 200 (1, 5), a G pixel 200 (1, 6), a G pixel 200 (2, 5) and a B pixel 200 (2, 6) form a Bayer array 201 (1, 3) which is provided with a common electrode 202 (1, 3). Likewise, an R pixel 200 (1, 7), a G pixel 200 (1, 8), a G pixel 200 (2, 7) and a B pixel 200 (2, 8) form a Bayer array 201 (1, 4) which is provided with a common electrode 202 (1, 4).

Similarly, an R pixel 200 (3, 1), a G pixel 200 (3, 2), a G pixel 200 (4, 1) and a B pixel 200 (4, 2) form a Bayer array 201 (2, 1) which is provided with a common electrode 202 (2, 1). By the same token, an R pixel 200 (3, 3), a G pixel 200 (3, 4), a G pixel 200 (4, 3) and a B pixel 200 (4, 4) form a Bayer array 201 (2, 2) which is provided with a common electrode 202 (2, 2). In the same way, an R pixel 200 (3, 5), a G pixel 200 (3, 6), a G pixel 200 (4, 5) and a B pixel 200 (4, 6) form a Bayer array 201 (2, 3) which is provided with a common electrode 202 (2, 3). Likewise, an R pixel 200 (3, 7), a G pixel 200 (3, 8), a G pixel 200 (4, 7) and a B pixel 200 (4, 8) form a Bayer array 201 (2, 4) which is provided with a common electrode 202 (2, 4).

Similarly, an R pixel 200 (5, 1), a G pixel 200 (5, 2), a G pixel 200 (6, 1) and a B pixel 200 (6, 2) form a Bayer array 201 (3, 1) which is provided with a common electrode 202 (3, 1). By the same token, an R pixel 200 (5, 3), a G pixel 200 (5, 4), a G pixel 200 (6, 3) and a B pixel 200 (6, 4) form a Bayer array 201 (3, 2) which is provided with a common electrode 202 (3, 2). In the same way, an R pixel 200 (5, 5), a G pixel 200 (5, 6), a G pixel 200 (6, 5) and a B pixel 200 (6, 6) form a Bayer array 201 (3, 3) which is provided with a common electrode 202 (3, 3). Likewise, an R pixel 200 (5, 7), a G pixel 200 (5, 8), a G pixel 200 (6, 7) and a B pixel 200 (6, 8) form a Bayer array 201 (3, 4) which is provided with a common electrode 202 (3, 4).

The common electrode 202 (1, 1) of the Bayer array 201 (1, 1), the common electrode 202 (2, 1) of the Bayer array 201 (2, 1) and the common electrode 202 (3, 1) of the Bayer array 201 (3, 1) are connected to the vertical signal line 203-1. By the same token, the common electrode 202 (1, 2) of the Bayer array 201 (1, 2), the common electrode 202 (2, 2) of the Bayer array 201 (2, 2) and the common electrode 202 (3, 2) of the Bayer array 201 (3, 2) are connected to the vertical signal line 203-2.

In the same way, the common electrode 202 (1, 3) of the Bayer array 201 (1, 3), the common electrode 202 (2, 3) of the Bayer array 201 (2, 3) and the common electrode 202 (3, 3) of the Bayer array 201 (3, 3) are connected to the vertical signal line 203-3. By the same token, the common electrode 202 (1, 4) of the Bayer array 201 (1, 4), the common electrode 202 (2, 4) of the Bayer array 201 (2, 4) and the common electrode 202 (3, 4) of the Bayer array 201 (3, 4) are connected to the vertical signal line 203-4.

As described above, each pixel 200 is provided also with a pixel electrode 205 which is connected to a horizontal signal line 204. To be more specific, the R pixel 200 (1, 1), the G pixel 200 (1, 4), the R pixel 200 (1, 5) and the G pixel 200 (1, 8) which are laid out along the first row of the first row Bayer array are connected to the horizontal signal line 204 (1, 1). By the same token, the G pixel 200 (1, 2), the R pixel 200 (1, 3), the G pixel 200 (1, 6) and the R pixel 200 (1, 7) which are laid out along the first row of the first row Bayer array are connected to the horizontal signal line 204 (1, 2).

In the same way, the G pixel 200 (2, 1), the B pixel 200 (2, 4), the G pixel 200 (2, 5) and the B pixel 200 (2, 8) which are laid out along the second row of the first row Bayer array are connected to the horizontal signal line 204 (1, 3). Likewise, the B pixel 200 (2, 2), the G pixel 200 (2, 3), the B pixel 200 (2, 6) and the G pixel 200 (2, 7) which are laid out along the second row of the first row Bayer array are connected to the horizontal signal line 204 (1, 4).

Similarly, the R pixel 200 (3, 1), the G pixel 200 (3, 4), the R pixel 200 (3, 5) and the G pixel 200 (3, 8) which are laid out along the first row of the second row Bayer array are connected to the horizontal signal line 204 (2, 1). By the same token, the G pixel 200 (3, 2), the R pixel 200 (3, 3), the G pixel 200 (3, 6) and the R pixel 200 (3, 7) which are laid out along the first row of the second row Bayer array are connected to the horizontal signal line 204 (2, 2).

In the same way, the G pixel 200 (4, 1), the B pixel 200 (4, 4), the G pixel 200 (4, 5) and the B pixel 200 (4, 8) which are laid out along the second row of the second row Bayer array are connected to the horizontal signal line 204 (2, 3). Likewise, the B pixel 200 (4, 2), the G pixel 200 (4, 3), the B pixel 200 (4, 6) and the G pixel 200 (4, 7) which are laid out along the second row of the second row Bayer array are connected to the horizontal signal line 204 (2, 4).

Similarly, the R pixel 200 (5, 1), the G pixel 200 (5, 4), the R pixel 200 (5, 5) and the G pixel 200 (5, 8) which are laid out along the first row of the third row Bayer array are connected to the horizontal signal line 204 (3, 1). By the same token, the G pixel 200 (5, 2), the R pixel 200 (5, 3), the G pixel 200 (5, 6) and the R pixel 200 (5, 7) which are laid out along the first row of the third row Bayer array are connected to the horizontal signal line 204 (3, 2).

In the same way, the G pixel 200 (6, 1), the B pixel 200 (6, 4), the G pixel 200 (6, 5) and the B pixel 200 (6, 8) which are laid out along the second row of the third row Bayer array are connected to the horizontal signal line 204 (3, 3). Likewise, the B pixel 200 (6, 2), the G pixel 200 (6, 3), the B pixel 200 (6, 6) and the G pixel 200 (6, 7) which are laid out along the second row of the third row Bayer array are connected to the horizontal signal line 204 (3, 4).

Figure 7:
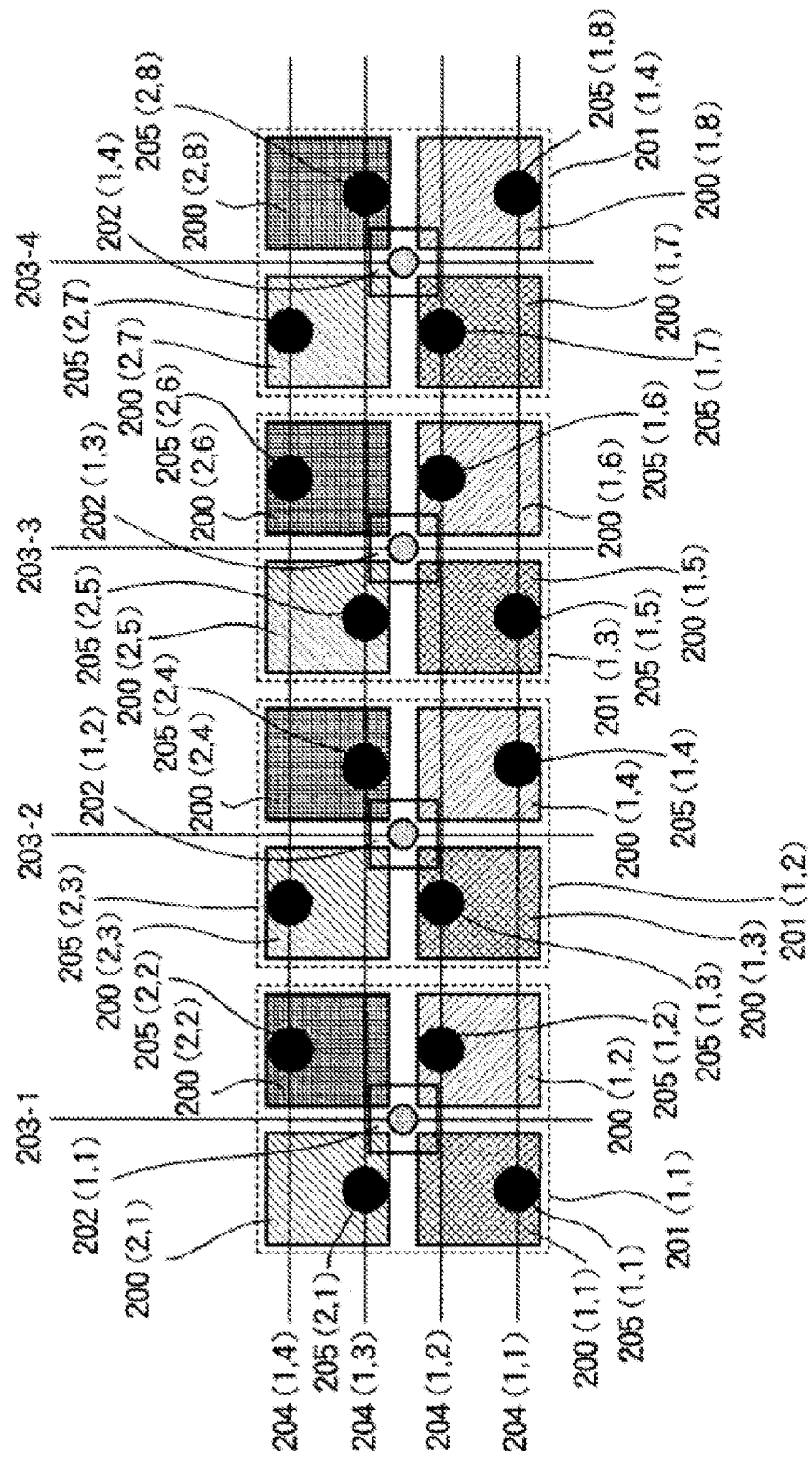
FIG. 7 is an explanatory diagram to be referred to in description of the locations of pixel electrodes in an image sensor.
Figure 8:
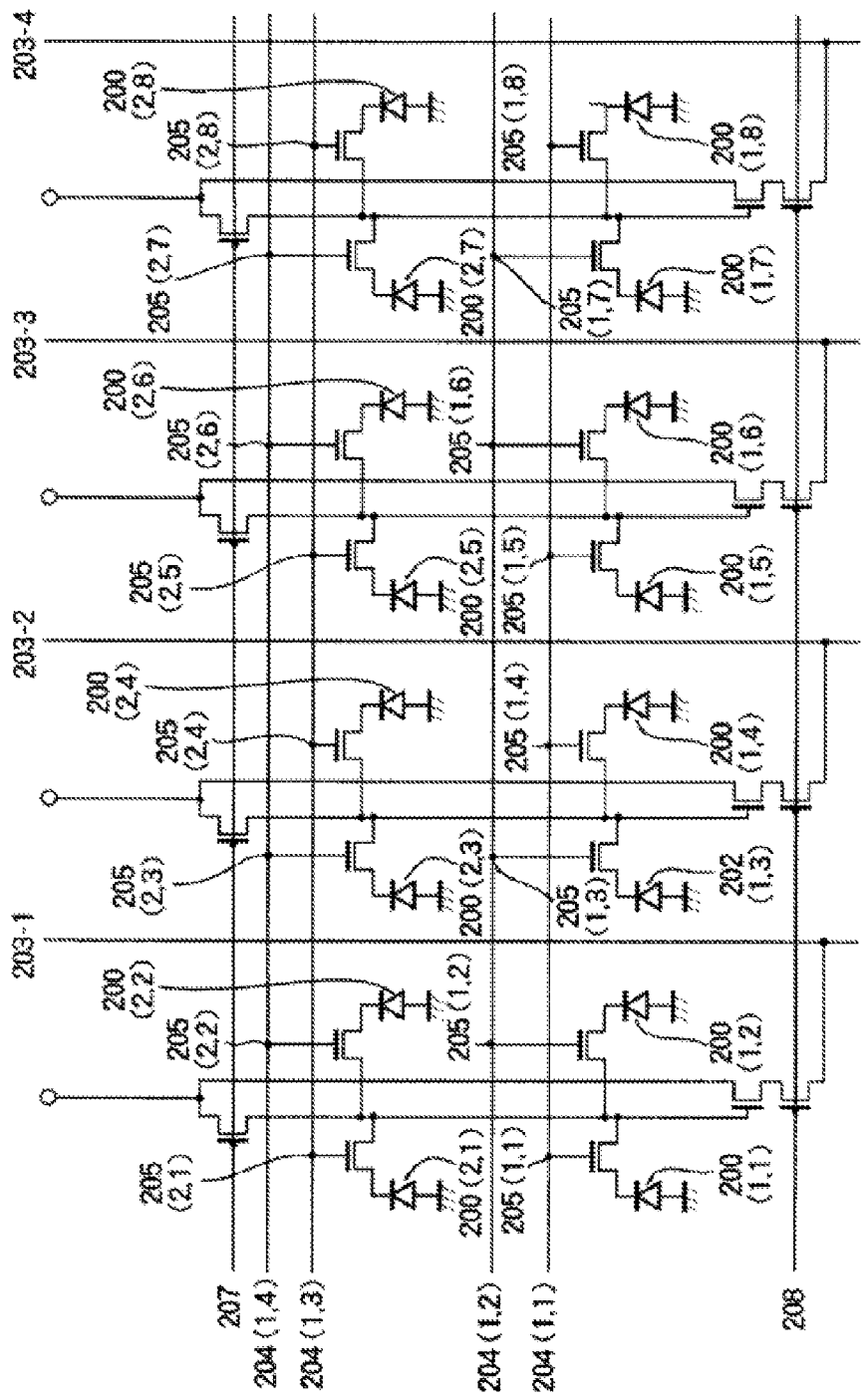
FIG. 8 is a circuit diagram showing the image sensor shown in the diagram of FIG. 7.

By referring to a diagram of FIG. 7, the following description further describes a relation between the pixel electrodes 205 each provided for a pixel 200 and the horizontal signal lines 204 each connected to one of the pixel electrodes 205. FIG. 7 is a diagram showing a portion of the image sensor shown in the diagram of FIG. 6. FIG. 8 is a diagram showing the circuit of the partial image sensor shown in the diagram of FIG. 7. The diagrams of FIGS. 7 and 8 are obtained by extracting the Bayer arrays 201 (1, 1), 201 (1, 2), 201 (1, 3) and 201 (1, 4) from the image sensor shown in the diagram of FIG. 6.

For example, let attention be paid to the Bayer array 201 (1, 1) including the R pixel 200 (1, 1) and the G pixel 200 (1, 2) which are adjacent to each other in the row direction. The R pixel 200 (1, 1) has a pixel electrode 205 (1, 1) on the lower side in the R pixel 200 (1, 1) whereas the G pixel 200 (1, 2) has a pixel electrode 205 (1, 2) on the upper side in the G pixel 200 (1, 2).

The Bayer array 201 (1, 1) also includes the G pixel 200 (2, 1) and the B pixel 200 (2, 2) which are adjacent to each other in the row direction. By the same token, the G pixel 200 (2, 1) has a pixel electrode 205 (2, 1) on the lower side in the G pixel 200 (2, 1) whereas the B pixel 200 (2, 2) has a pixel electrode 205 (2, 2) on the upper side in the B pixel 200 (2, 2).

That is to say, pixel electrodes 205 adjacent to each other in the row direction inside the Bayer array 201 (1, 1) are placed alternately on the lower and upper sides of the pixels 200 of the Bayer array 201 (1, 1). In addition, each of the pixel electrodes 205 adjacent to each other in the row direction inside the Bayer array 201 (1, 1) is connected to one of different horizontal signal lines 204.

In addition, for example, let attention be paid to the Bayer array 201 (1, 1) including the R pixel 200 (1, 1) and the G pixel 200 (2, 1) which are adjacent to each other in the column direction. The R pixel 200 (1, 1) has a pixel electrode 205 (1, 1) on the lower side in the R pixel 200 (1, 1) whereas the G pixel 200 (2, 1) has a pixel electrode 205 (2, 1) also on the lower side in the G pixel 200 (2, 1).

The Bayer array 201 (1, 1) also includes the G pixel 200 (1, 2) and the B pixel 200 (2, 2) which are adjacent to each other in the column direction. By the same token, the G pixel 200 (1, 2) has a pixel electrode 205 (1, 2) on the upper side in the G pixel 200 (1, 2) whereas the B pixel 200 (2, 2) has a pixel electrode 205 (2, 2) also on the lower side in the B pixel 200 (2, 2).

That is to say, pixel electrodes 205 adjacent to each other in the column direction inside the Bayer array 201 (1, 1) are placed on the same lower or upper side in the pixels 200 of the Bayer array 201 (1, 1). In addition, each of the pixel electrodes 205 adjacent to each other in the row direction inside the Bayer array 201 (1, 1) is connected to one of different horizontal signal lines 204.

The pixel electrodes 205 of adjacent pixels 200 in the Bayer array 201 are placed at locations which are related to each other as described above. The following description explains relations between the locations of the pixel electrodes 205 of pixels 200 in Bayer arrays 201 adjacent to each other in the row direction. For example, let attention be paid to the Bayer arrays 201 (1, 1) and 201 (1, 2) which are adjacent to each other in the row direction. The pixel electrode 205 (1, 2) of the G pixel 200 (1, 2) in the Bayer array 201 (1, 1) is placed on the upper side in the G pixel 200 (1, 2) whereas the pixel electrode 205 (1, 3) of the R pixel 200 (1, 3) included in the Bayer array 201 (1, 2) as a pixel 200 adjacent to the G pixel 200 (1, 2) is placed also on the upper side in the R pixel 200 (1, 3). By the same token, the pixel electrode 205 (2, 2) of the B pixel 200 (2, 2) in the Bayer array 201 (1, 1) is placed on the upper side in the B pixel 200 (2, 2) whereas the pixel electrode 205 (2, 3) of the G pixel 200 (2, 3) included in the Bayer array 201 (1, 2) as a pixel 200 adjacent to the B pixel 200 (2, 2) is placed also on the upper side in the G pixel 200 (2, 3).

A specific Bayer array 201 includes pixels 200 adjacent in the row direction to pixels 200 in another Bayer array 201 adjacent to the specific Bayer array 201 in the row direction. As described above, the pixel electrodes 205 of the pixels 200 in the specific Bayer array 201 and the pixel electrodes 205 of the pixels 200 in the adjacent Bayer array 201 are placed on the upper side. In addition, the pixel electrode 205 of a specific pixel 200 included in a specific Bayer array 201 is connected by a horizontal signal line 204 to the pixel electrode 205 of a pixel 200 included in the other Bayer array 201 as a pixel 200 adjacent to the specific pixel 200 in the row direction.

Let attention be paid to another pair of adjacent Bayer arrays 201. To be more specific, for example, let attention be paid to the Bayer arrays 201 (1, 2) and 201 (1, 3) which are adjacent to each other in the row direction. The pixel electrode 205 (1, 4) of the G pixel 200 (1, 4) in the Bayer array 201 (1, 2) is placed on the lower side in the G pixel 200 (1, 4) whereas the pixel electrode 205 (1, 5) of the R pixel 200 (1, 5) included in the Bayer array 201 (1, 3) as a pixel 200 adjacent to the G pixel 200 (1, 4) is placed also on the lower side in the R pixel 200 (1, 5). By the same token, the pixel electrode 205 (2, 4) of the B pixel 200 (2, 4) in the Bayer array 201 (1, 2) is placed on the lower side in the B pixel 200 (2, 4) whereas the pixel electrode 205 (2, 5) of the G pixel 200 (2, 5) included in the Bayer array 201 (1, 3) as a pixel 200 adjacent to the B pixel 200 (2, 4) is placed also on the lower side in the G pixel 200 (2, 5).

A specific Bayer array 201 includes other pixels 200 adjacent in the row direction to other pixels 200 in another Bayer array 201 adjacent to the specific Bayer array 201 in the row direction. In this case, however, the pixel electrodes 205 of the pixels 200 in the specific Bayer array 201 and the pixel electrodes 205 of the pixels 200 in the adjacent Bayer array 201 are placed on the lower side. In addition, the pixel electrode 205 of a specific pixel 200 included in a specific Bayer array 201 is connected by a horizontal signal line 204 to the pixel electrode 205 of a pixel 200 included in the other Bayer array 201 as a pixel 200 adjacent to the specific pixel 200 in the row direction.

That is to say, the pixel electrodes 205 of specific pixels 200 in any specific Bayer array 201 and the pixel electrodes 205 of pixels 200 included in a Bayer array 201 adjacent to the specific Bayer array 201 as pixels 200 adjacent to the specific pixels are placed on the same side, that is, either the lower or upper side in the pixels 200. In addition, the pixel electrode 205 of a specific pixel 200 included in any specific Bayer array 201 is connected by a horizontal signal line 204 to the pixel electrode 205 of a pixel 200 included in a Bayer array 201 adjacent to the specific Bayer array 201 as a pixel 200 adjacent to the specific pixel 200.

The following description explains relations between the locations of the pixel electrodes 205 of pixels 200 in Bayer arrays 201 adjacent to each other in the column direction. For example, let attention be paid to the Bayer arrays 201 (1, 1) and 201 (2, 1) which are adjacent to each other in the column direction as shown in the diagram of FIG. 6. The pixel electrodes 205 of pixels 200 included in the Bayer arrays 201 (1, 1) and 201 (2, 1) as pixels 200 aligned along the same column of the pixel matrix are located on the same side, that is, either the lower or upper side in the pixels 200.

That is to say, the pixel electrodes 205 of specific pixels 200 in any specific Bayer array 201 and the pixel electrodes 205 of pixels 200 included in a Bayer array 201 adjacent to the specific Bayer array 201 in the column direction as pixels 200 adjacent to the specific pixels 200 in the column direction are placed on the same side, that is, either the lower or upper side in the pixels 200. In addition, the pixel electrode 205 of the specific pixel 200 included in the specific Bayer array 201 is connected to a horizontal signal line 204 different from a horizontal signal line 204 connected to the pixel electrode 205 of the adjacent pixel 200 included in the adjacent Bayer array 201. However, the pixel electrode 205 of the specific pixel 200 included in the specific Bayer array 201 is connected by a vertical signal line 203 to the pixel electrode 205 of the adjacent pixel 200 included in the adjacent Bayer array 201.

The above description explains where the pixel electrodes 205 are located and how the pixel electrodes 205 are connected to each other by the horizontal signal lines 204 and the vertical signal lines 203. The following description explains relations between the positions of the pixel electrodes 205 of pixels 200 in any specific Bayer array 201 and the positions of the pixel electrodes 205 of pixels 200 in a Bayer array 201 adjacent to the specific Bayer array 201. For example, let attention be paid to the Bayer arrays 201 (1, 1) and 201 (1, 2) which are adjacent to each other. The positions of the pixel electrodes 205 of pixels 200 in the Bayer array 201 (1, 1) are the mirror image of the positions of the pixel electrodes 205 of pixels 200 in the Bayer array 201 (1, 2) and, conversely, the positions of the pixel electrodes 205 of pixels 200 in the Bayer array 201 (1, 2) are the mirror image of the positions of the pixel electrodes 205 of pixels 200 in the Bayer array 201 (1, 1).

The connections of the pixel electrodes 205 and the horizontal signal lines 204 are explained below. That is to say, the pixel electrodes 205 are wired to the horizontal signal lines 204 as follows.

Figure 1:
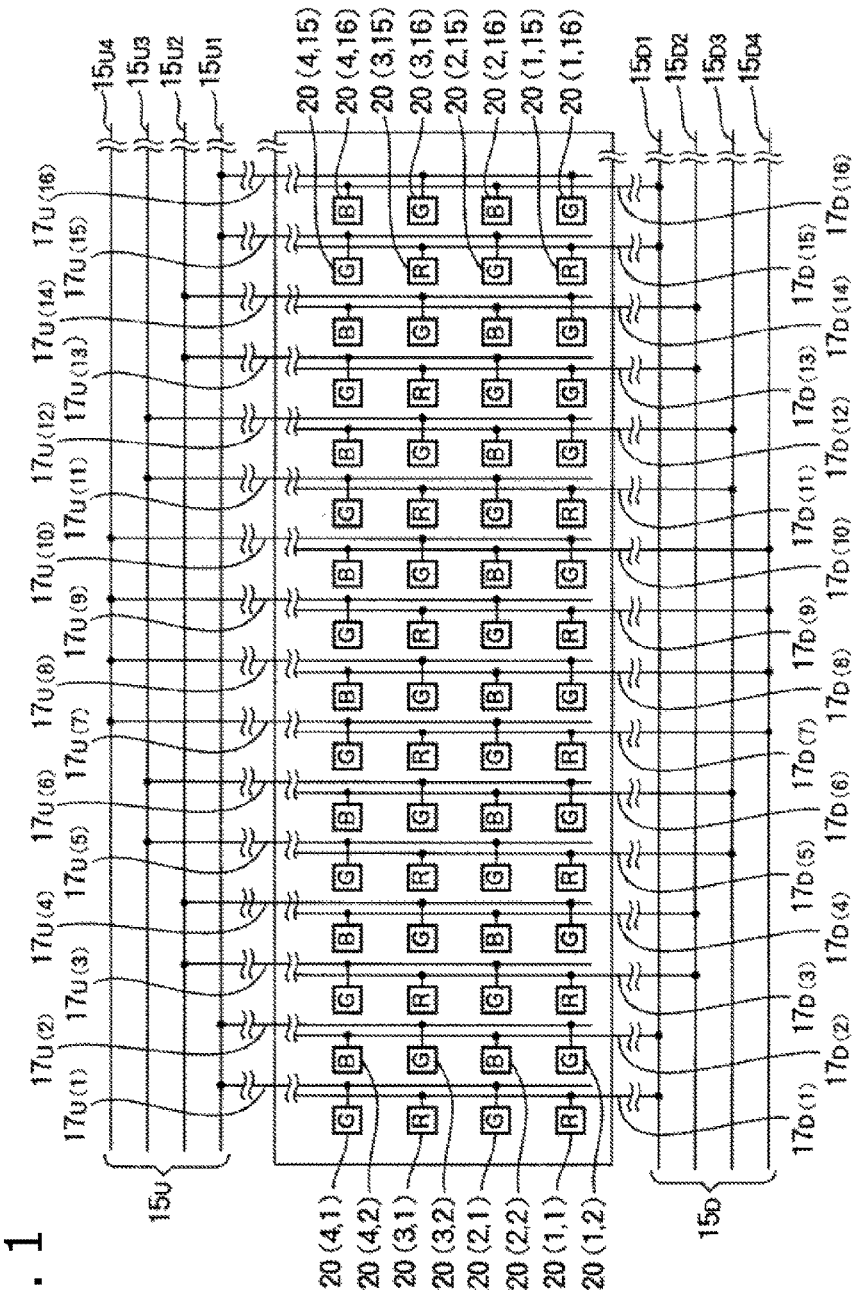
FIG. 1 is a diagram showing the configuration of a typical example of the existing image sensor.
Figure 2:
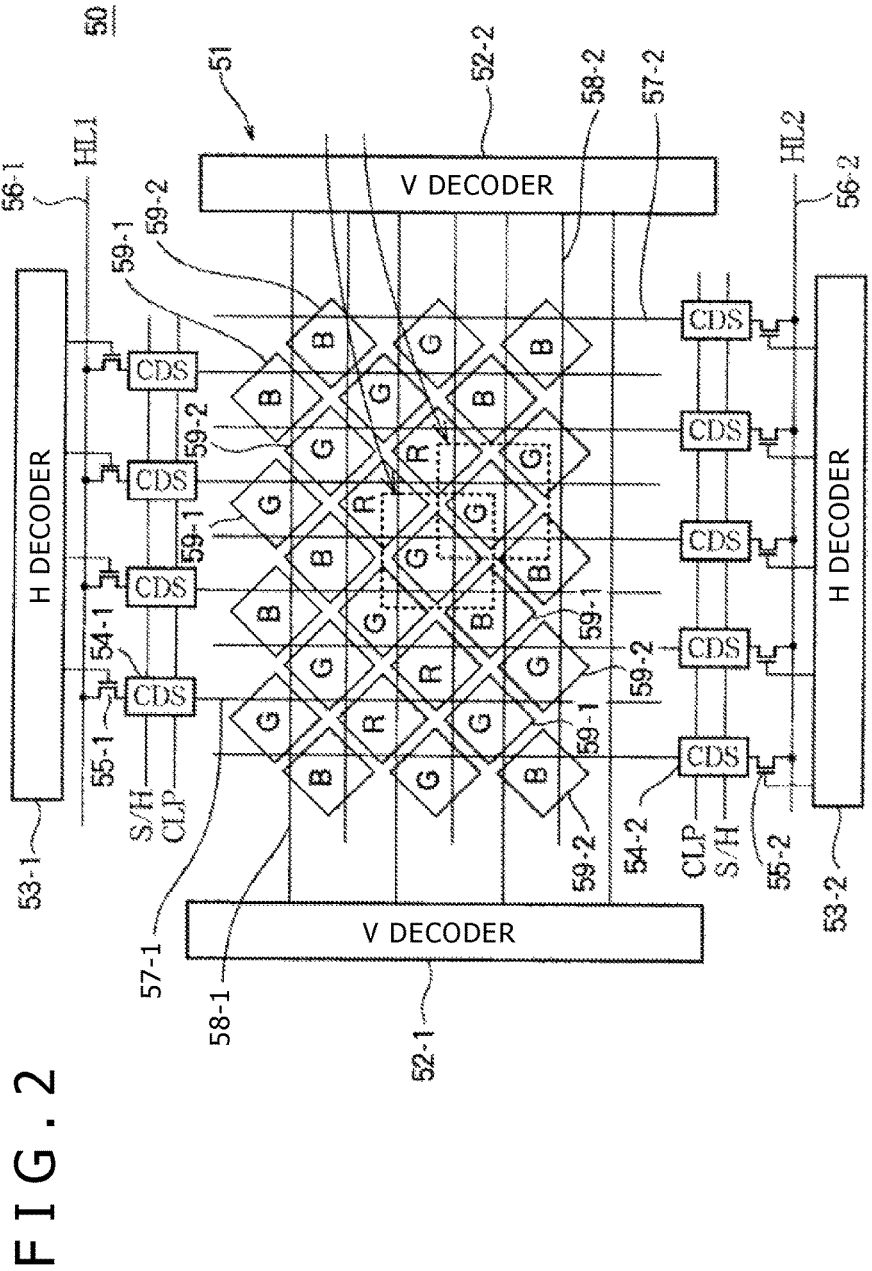
FIG. 2 is a diagram showing the configuration of a typical example of the existing image sensor.
Figure 3:
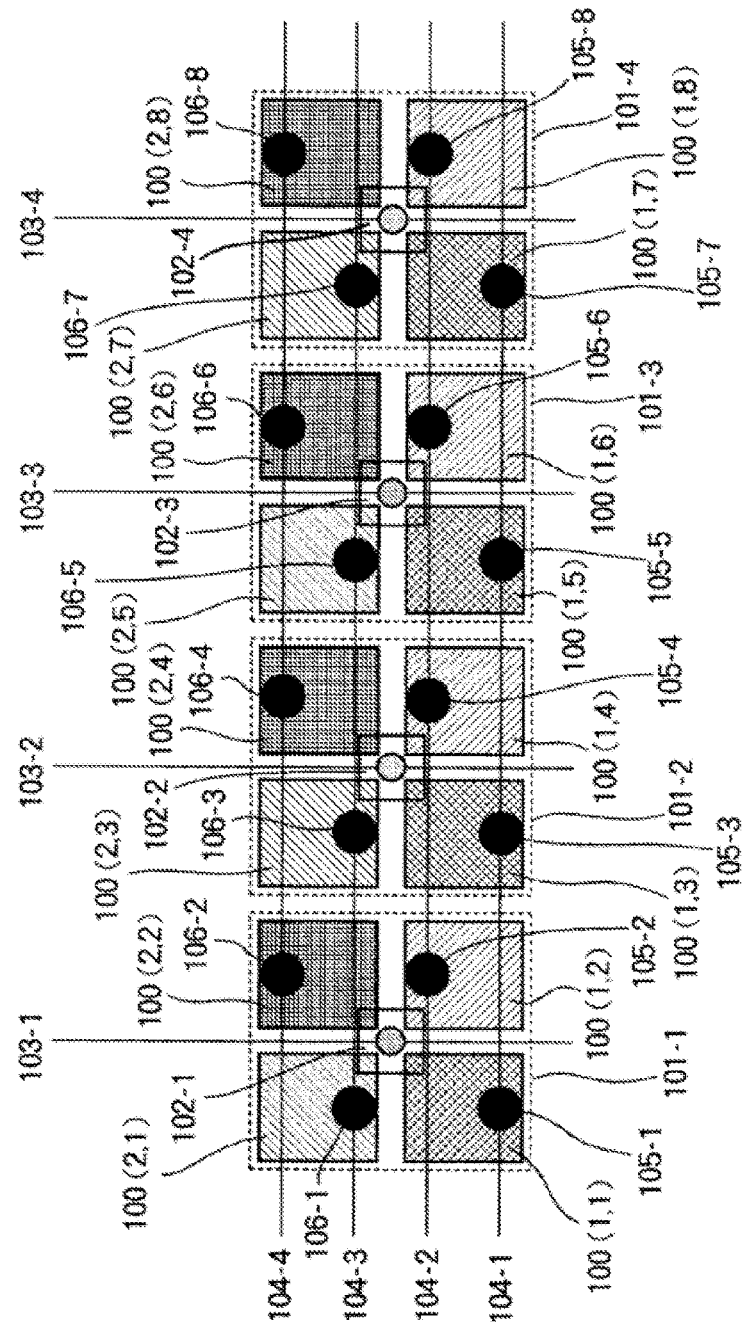
FIG. 3 is an explanatory diagram to be referred to in description of the locations of pixel electrodes in the existing image sensor.
Figure 4:
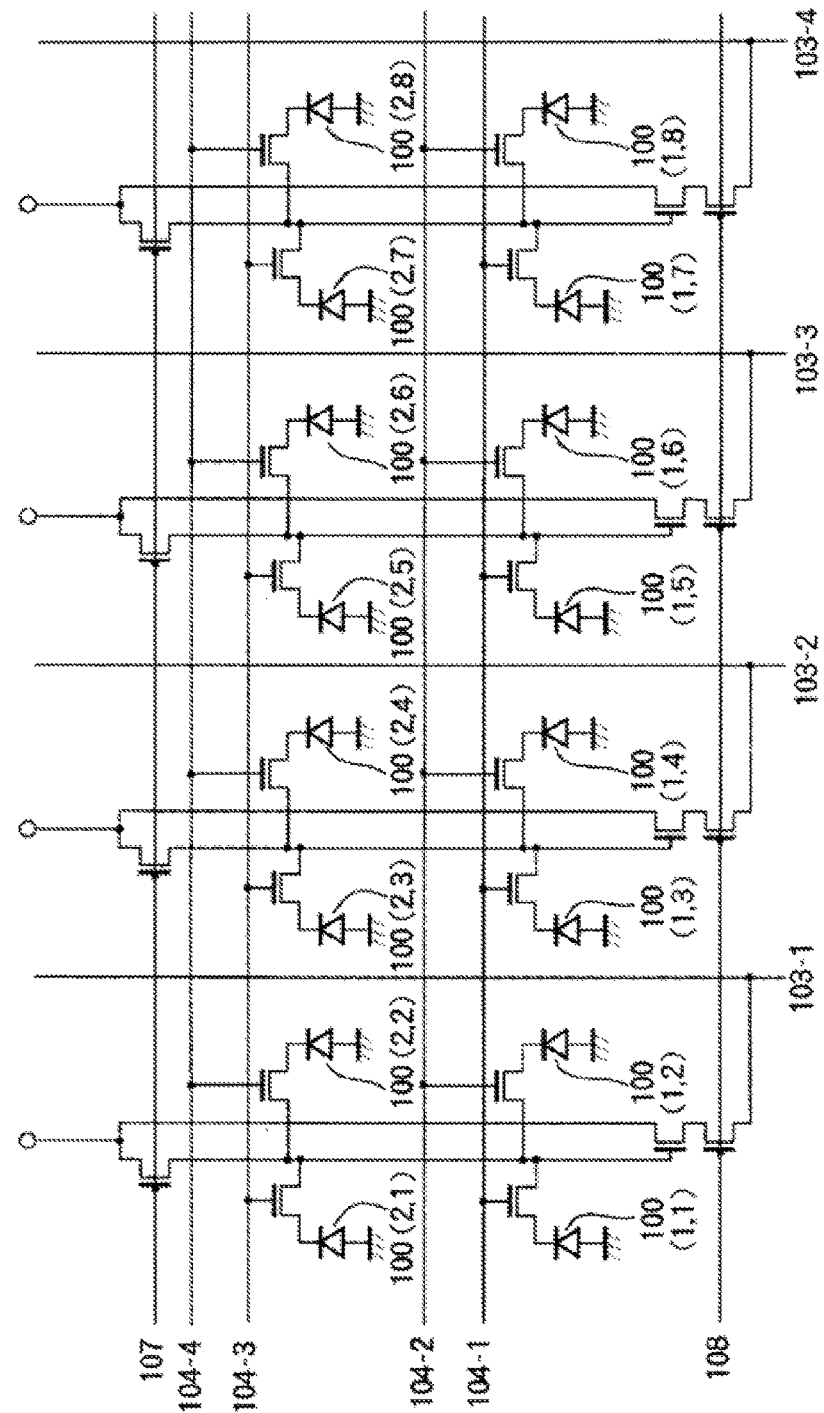
FIG. 4 is a circuit diagram showing the existing image sensor.

As shown in the diagrams of FIGS. 7 and 8, 1 Bayer array includes 4 pixels, i.e., an R pixel, a G1 pixel, a G2 pixel and a B pixel. The 4 square pixels are arranged in the Bayer array to create a square shape of the array. Let attention be paid to 2 such Bayer arrays adjacent to each other. In this case, the R pixel of a first one of the 2 Bayer arrays is connected to the G1 pixel of the second Bayer array adjacent to the first Bayer array in the horizontal direction, that is, the row direction in this case, by a first horizontal signal line. In general, in a plurality of Bayer arrays, the R pixel of an odd-numbered Bayer array is always connected to the G1 pixel of an even-numbered Bayer array by a first horizontal signal line.

The connection of the R pixel of an even-numbered Bayer array to the G1 pixel of an odd-numbered Bayer array by a first horizontal signal line in a plurality of Bayer arrays such as first and second Bayer arrays is explained by associating the connection with the image sensor shown in the diagram of FIG. 7 as follows. The first Bayer array corresponds to the Bayer array 201 (1, 1) whereas the second Bayer array corresponds to the Bayer array 201 (1, 2). The R pixel corresponds to the R pixel 200 (1, 1) whereas the G1 pixel corresponds to the G pixel 200 (1, 4). The first horizontal signal line corresponds to the horizontal signal line 204 (1, 1).

A plurality of Bayer arrays arranged in the horizontal direction are the Bayer arrays 201 (1, 1), 201 (1, 2), 201 (1, 3) and 201 (1, 4) shown in the diagram of FIG. 7. The odd-numbered Bayer arrays are the Bayer arrays 201 (1, 1) and 201 (1, 3) which are each denoted by a notation including an odd column number used as a right-hand side subscript. The R pixels 200 in the odd-numbered Bayer arrays 201 (1, 1) and 201 (1, 3) are the R pixels 200 (1, 1) and 200 (1, 5). By the same token, the even-numbered Bayer arrays are the Bayer arrays 201 (1, 2) and 201 (1, 4) which are each denoted by a notation including an even column number used as a right-hand side subscript. The G1 pixels 200 in the even-numbered G1 Bayer arrays 201 (1, 2) and 201 (1, 4) are the G1 pixels 200 (1, 4) and 200 (1, 8). The 4 Bayer arrays 200 (1, 1), 200 (1, 2), 200 (1, 3) and 200 (1, 4) are connected to each other by the first horizontal signal line, which is the horizontal signal line 204 (1, 1).

For the sake of uniform notations, the horizontal signal line 204 (1, 2) is used as the second horizontal signal line, the horizontal signal line 204 (1, 3) is used as the third horizontal signal line and the horizontal signal line 204 (1, 4) is used as the fourth horizontal signal line. In this way, in the following description, subscript n used in reference notation 204 (m, n) denoting a horizontal signal line is an integer indicating that the horizontal signal line 204 (m, n) is the nth horizontal signal line. In the case of the horizontal signal line 204 (1, 2) for example, subscript n has a value of 2 (that is, n=2). Thus, the horizontal signal line 204 (1, 2) is the second horizontal signal line.

In addition, subscript n used in reference notation 201 (m, n) denoting a Bayer array is an integer having a value indicating that the Bayer array 201 (m, n) is an odd-numbered Bayer array or an even-numbered Bayer array. In the case of the Bayer array 201 (1, 1) for example, subscript n has a value of 1 (that is, n=1). Thus, the Bayer array 201 (1, 1) is an odd-numbered Bayer array. In the case of the Bayer array 201 (1, 2), on the other hand, subscript n has a value of 2 (that is, n=2). Thus, the Bayer array 201 (1, 2) is an even-numbered Bayer array.

The notations described above are applied to the horizontal signal lines other than the first horizontal signal line as follows. The G1 pixel of a first one of 2 adjacent Bayer arrays is connected to the R pixel of the second Bayer array adjacent to the first Bayer array in the horizontal direction by a second horizontal signal line. In general, in a plurality of Bayer arrays, the G1 pixel of an odd-numbered Bayer array is always connected to the R pixel of an even-numbered Bayer array by a second horizontal signal line.

By the same token, the G2 pixel of a first one of 2 adjacent Bayer arrays is connected to the B pixel of the second Bayer array adjacent to the first Bayer array in the horizontal direction by a third horizontal signal line. In general, in a plurality of Bayer arrays, the G2 pixel of an odd-numbered Bayer array is always connected to the B pixel of an even-numbered Bayer array by a third horizontal signal line.

In the same way, the B pixel of a first one of 2 adjacent Bayer arrays is connected to the G2 pixel of the second Bayer array adjacent to the first Bayer array in the horizontal direction by a fourth horizontal signal line. In general, in a plurality of Bayer arrays, the B pixel of an odd-numbered Bayer array is always connected to the G2 pixel of an even-numbered Bayer array by a fourth horizontal signal line.

What has been described above is summarized as follows. A Bayer array is composed of 4 pixels. The pixel on the left lower side in the Bayer array is referred to as the first pixel, the pixel on the right lower side in the Bayer array is referred to as the second pixel, the pixel on the left upper side in the Bayer array is referred to as the third pixel and the pixel on the right upper side in the Bayer array is referred to as the fourth pixel. The horizontal direction is taken as the direction of the horizontal signal lines whereas the vertical direction is taken as the direction of the vertical signal lines. In this case, the first pixel in a Bayer array denoted by a notation including an odd column number is connected to the second pixel in a Bayer array denoted by a notation including an even column number by a first horizontal signal line. The second pixel in a Bayer array denoted by a notation including an odd column number is connected to the first pixel in a Bayer array denoted by a notation including an even column number by a second horizontal signal line. The third pixel in a Bayer array denoted by a notation including an odd column number is connected to the fourth pixel in a Bayer array denoted by a notation including an even column number by a third horizontal signal line. The fourth pixel in a Bayer array denoted by a notation including an odd column number is connected to the third pixel in a Bayer array denoted by a notation including an even column number by a fourth horizontal signal line.

The method for connecting a pixel in a specific Bayer array to a pixel in another Bayer array adjacent to the specific Bayer array is no more than a typical connection method. For example, the pixel in the specific Bayer array can be combined with another pixel in the other Bayer array adjacent to the specific Bayer array to form a pair in conjunction with the other pixel in the other Bayer array. Thus, there are 4 formed pixel pairs different from the 4 pixel pairs described above. The 2 pixels in every pair are then connected to each other by one of the 4 horizontal signal lines.

The following description explains read operations carried out by the image sensor provided with a configuration in which each pixel is provided with a pixel electrode which is connected to other pixel electrodes as described above.

Figure 9:
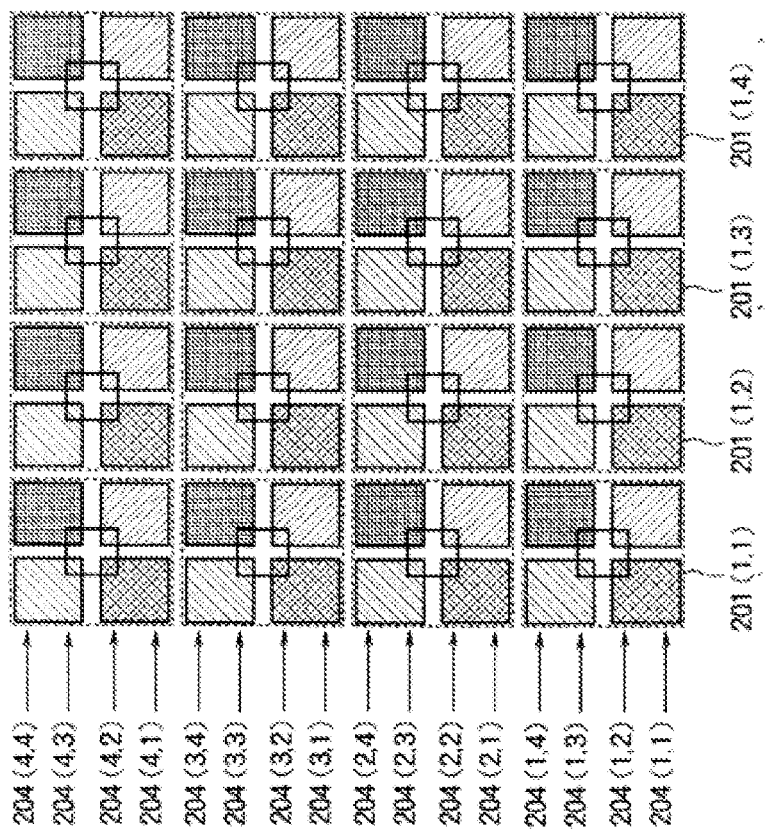
FIG. 9 is an explanatory diagram to be referred to in description of read operations carried out in an all-pixel read mode.

FIG. 9 is an explanatory diagram referred to in description of the number of read operations carried out in an all-pixel read mode. In order to read out pixel signals from the 4 pixels 200, that is, the R, G1, G2 and B pixels 200, of 1 Bayer array 201, it is necessary to carry out 4 read operations. To put it more concretely, for example, in order to read out the pixel signal of the R pixel 200 (1, 1) of the Bayer array 201 (1, 1), the pixel signal is read out through the horizontal signal line 204 (1, 1), in order to read out the pixel signal of the G pixel 200 (1, 2) of the Bayer array 201 (1, 1), the pixel signal is read out through the horizontal signal line 204 (1, 2), in order to read out the pixel signal of the G pixel 200 (2, 1) of the Bayer array 201 (1, 1), the pixel signal is read out through the horizontal signal line 204 (1, 3) and, in order to read out the pixel signal of the B pixel 200 (2, 2) of the Bayer array 201 (1, 1), the pixel signal is read out through the horizontal signal line 204 (1, 4).

Since a read operation is carried out to read out a pixel signal through each of the first horizontal signal line 204 (1, 1), the second horizontal signal line 204 (1, 2), the third horizontal signal line 204 (1, 3) and the fourth horizontal signal line 204 (1, 4), a total of 4 read operations are demanded.

Figure 10:
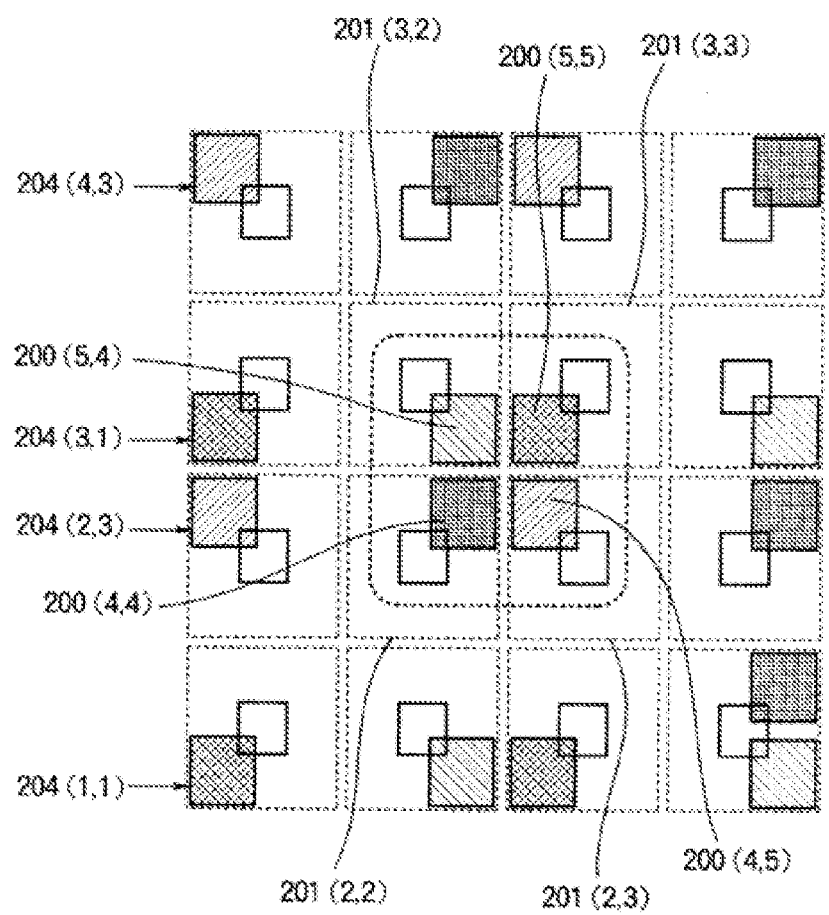
FIG. 10 is an explanatory diagram to be referred to in description of read operations carried out in a thinned-out read mode.

FIG. 10 is an explanatory diagram referred to in description of the number of read operations carried out in the ½ thinned-out read mode. In order to read out pixel signals from the 4 pixels 200, that is, the R, G1, G2 and B pixels 200, of 1 Bayer array, it is necessary to carry out 2 read operations. In addition, in the ½ thinned-out read mode, pixel signals are read out from pixels 200 by changing the selected horizontal signal line 204.

In the typical example shown in the diagram of FIG. 10, pixel signals are read out from one Bayer array through the first and third horizontal signal lines.

Pixel signals are read out from Bayer arrays by changing the selected horizontal signal line from array to array. That is to say, in an operation to read out a pixel signal from the first row Bayer array, the first horizontal signal line is selected, in an operation to read out a pixel signal from the second row Bayer array, the third horizontal signal line is selected, in an operation to read out a pixel signal from the third row Bayer array, the first horizontal signal line is selected and, in an operation to read out a pixel signal from the fourth row Bayer array, the third horizontal signal line is selected.

That is to say, in this case, in general, for a Bayer array denoted by a notation including an odd row number, that is, for the first and third row Bayer arrays for example, the first horizontal signal line is selected and, for a Bayer array denoted by a notation including an even row number, that is, for the second and fourth row Bayer arrays for example, on the other hand, the third horizontal signal line is selected.

As an example, let attention be paid to the second and third row Bayer arrays. In the diagram of FIG. 10, the second row Bayer arrays include Bayer arrays 201 (2, 2) and 201 (2, 3) whereas the third row Bayer arrays include Bayer arrays 201 (3, 2) and 201 (3, 3). The following description additionally explains a way to read out pixel signals from the second and third row Bayer arrays as shown in the diagram of FIG. 10. By making use of the horizontal signal line 204 (3, 1) as the first horizontal signal line, pixel signals can be read out from the G pixel 200 (5, 4) and the R pixel 200 (5, 5) of the Bayer arrays 201 (3, 2) and 201 (3, 3) respectively. In addition, by making use of the horizontal signal line 204 (2, 3) as the third horizontal signal line, pixel signals can be read out from the B pixel 200 (4, 4) and the G pixel 200 (4, 5) of the Bayer arrays 201 (2, 2) and 201 (2, 3) respectively.

The G pixel 200 (5, 4), the R pixel 200 (5, 5), the B pixel 200 (4, 4) and the G pixel 200 (4, 5) of the Bayer arrays 201 (3, 2), 201 (3, 3), 201 (2, 2) and 201 (2, 3) respectively form 1 new Bayer array. Even though the G pixel 200 (5, 4), the R pixel 200 (5, 5), the B pixel 200 (4, 4) and the G pixel 200 (4, 5) pertain to different Bayer arrays 201, these pixels 200 can be used respectively as 4 pixels, i.e., G2, R, B and G1 pixels of the new Bayer array so that the new Bayer array can be created. Thus, processing can be carried out by forming the new Bayer array from the 4 pixels 200, that is, the G pixel 200 (5, 4), the R pixel 200 (5, 5), the B pixel 200 (4, 4) and the G pixel 200 (4, 5).

Figure 5:
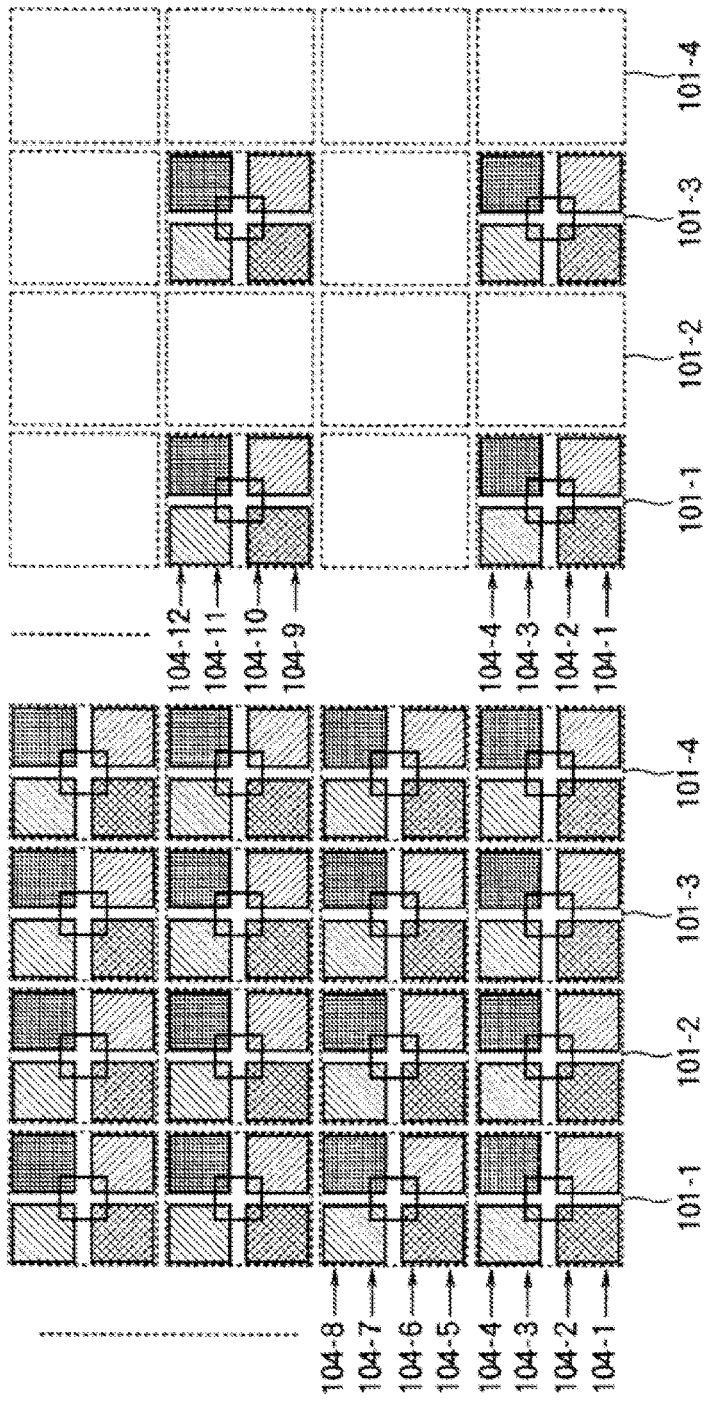
FIGS. 5A and 5B are an explanatory diagrams to be referred to in description of operations to read out pixel signals from the existing image sensor.

By doing so, in 2 horizontal scan operations, pixel signals of 1 Bayer array can be read out. This read operation can be carried out by performing the horizontal scan operation half the number of times demanded in the past as explained before by referring to the diagram of FIG. 5B. Thus, the processing speed can be increased.

Figure 11:
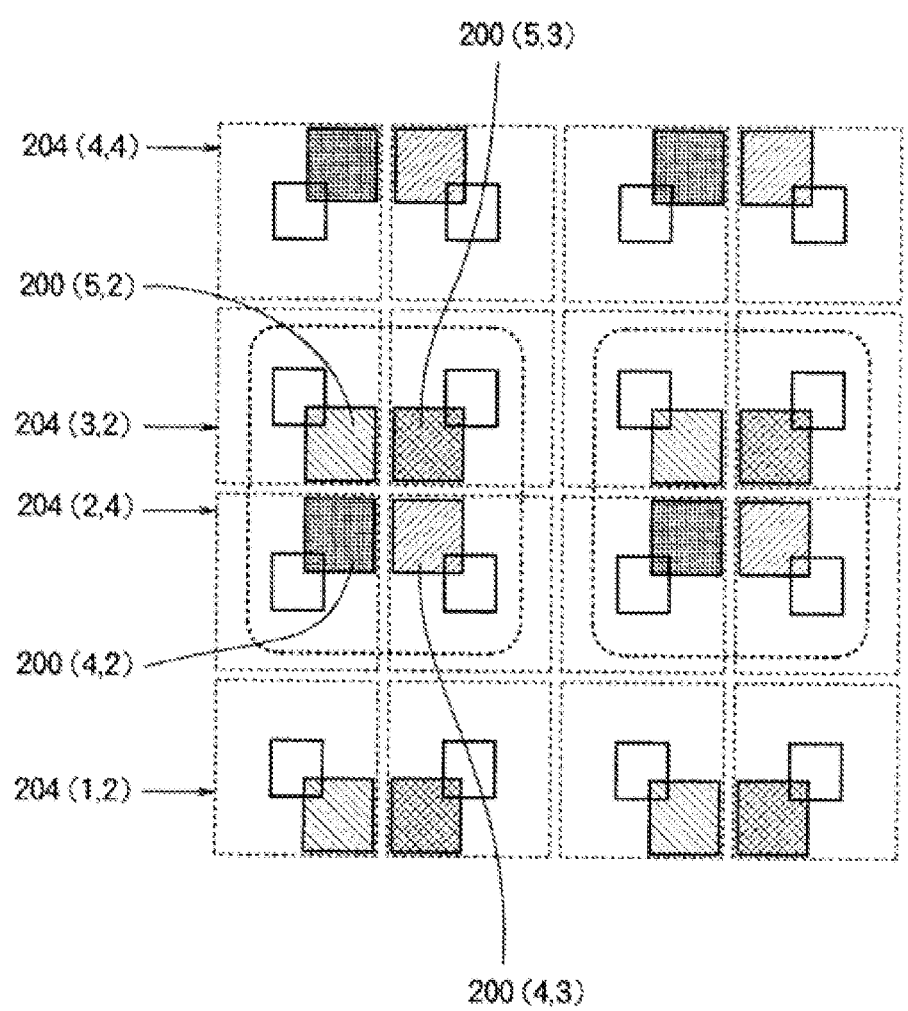
FIG. 11 is an explanatory diagram to be referred to in description of read operations carried out in a thinned-out read mode.

In the typical example shown in the diagram of FIG. 10, the first and third horizontal signal lines are used. In another typical example shown in a diagram of FIG. 11, on the other hand, the second and fourth horizontal signal lines are used. FIG. 11 is an explanatory diagram referred to in description of the number of read operations carried out in the ½ thinned-out read mode for a case in which the second and fourth horizontal signal lines are used.

Pixel signals are read out from Bayer arrays by changing the horizontal signal line from array to array. That is to say, in an operation to read out a pixel signal from the first row Bayer array, the second horizontal signal line is selected, in an operation to read out a pixel signal from the second row Bayer array, the fourth horizontal signal line is selected, in an operation to read out a pixel signal from the third row Bayer array, the second horizontal signal line is selected and, in an operation to read out a pixel signal from the fourth row Bayer array, the fourth horizontal signal line is selected. In this case, for a Bayer array denoted by a notation including an odd row number, the second horizontal signal line is selected and, for a Bayer array denoted by a notation including an even row number, on the other hand, the fourth horizontal signal line is selected.

As an example, let attention be paid to the second and third row Bayer arrays. The following description additionally explains a way to read out pixel signals from the second and third row Bayer arrays. By making use of the horizontal signal line 204 (3, 2) as the second horizontal signal line, pixel signals can be read out from the G pixel 200 (5, 2) and the R pixel 200 (5, 3). In addition, by making use of the horizontal signal line 204 (2, 4) as the fourth horizontal signal line, pixel signals can be read out from the B pixel 200 (4, 2) and the G pixel 200 (4, 3).

The G pixel 200 (5, 2), the R pixel 200 (5, 3), the B pixel 200 (4, 2) and the G pixel 200 (4, 3) form a new Bayer array. Also in this case, even though the G pixel 200 (5, 2), the R pixel 200 (5, 3), the B pixel 200 (4, 2) and the G pixel 200 (4, 3) pertain to different Bayer arrays, these pixels can be used respectively as 4 pixels, i.e., G2, R, B and G1 pixels of the new Bayer array so that the new Bayer array can be created. Thus, processing can be carried out by forming the new Bayer array from the 4 pixels 200, that is, the G pixel 200 (5, 2), the R pixel 200 (5, 3), the B pixel 200 (4, 2) and the G pixel 200 (4, 3).

Also in the case of the typical example shown in the diagram of FIG. 11, in 2 horizontal scan operations, pixel signals of 1 Bayer array can be read out. This read operation can be carried out by performing the horizontal scan operation half the number of times demanded in the past. Thus, the processing speed can be increased.

Figure 12:
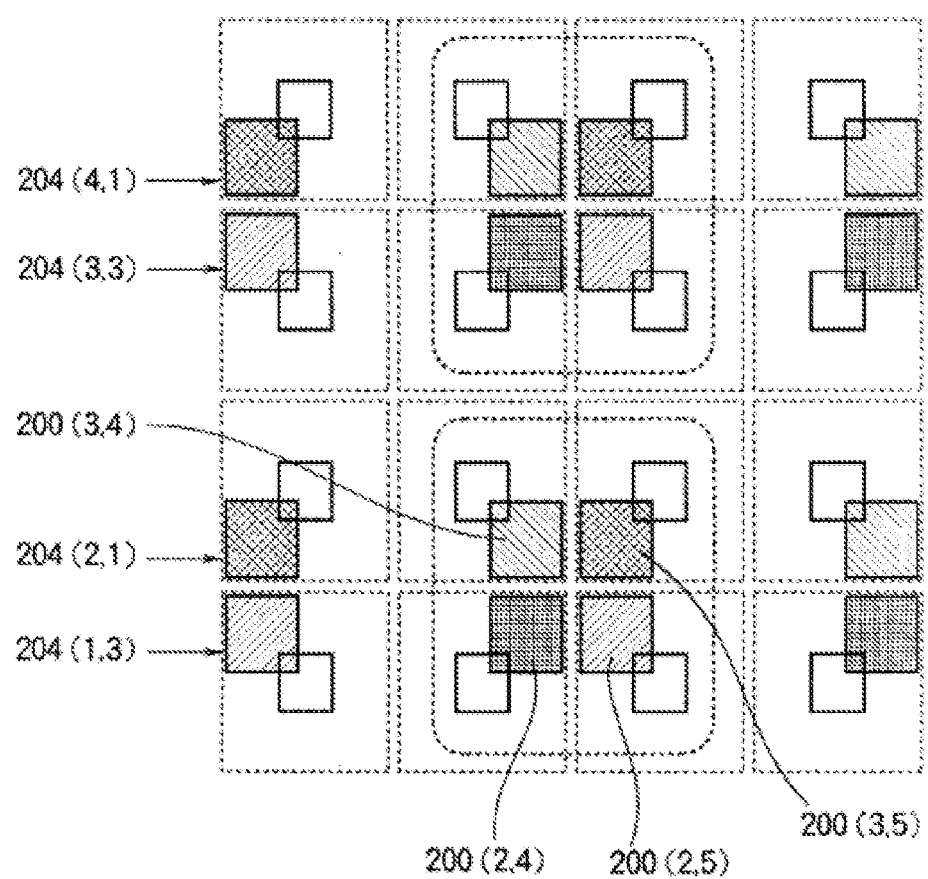
FIG. 12 is an explanatory diagram to be referred to in description of read operations carried out in a thinned-out read mode.

In another typical example shown in a diagram of FIG. 12, the first and third horizontal signal lines are used. FIG. 12 is an explanatory diagram referred to in description of the number of read operations carried out in the ½ thinned-out read mode for a case in which the first and third horizontal signal lines are used.

Pixel signals are read out from Bayer arrays by changing the horizontal signal line from array to array. That is to say, in an operation to read out a pixel signal from the first row Bayer array, the third horizontal signal line is selected, in an operation to read out a pixel signal from the second row Bayer array, the first horizontal signal line is selected, in an operation to read out a pixel signal from the third row Bayer array, the third horizontal signal line is selected and, in an operation to read out a pixel signal from the fourth row Bayer array, the first horizontal signal line is selected. In this case, in general, for a Bayer array denoted by a notation including an odd row number, the third horizontal signal line is selected and, for a Bayer array denoted by a notation including an even row number, on the other hand, the first horizontal signal line is selected.

Much like the typical example shown in the diagram of FIG. 10, in the typical example shown in the diagram of FIG. 12, the first and third horizontal signal lines are used. However, the order of selecting the first and third horizontal signal lines in the typical example shown in the diagram of FIG. 12 is opposite to the order of selecting the first and third horizontal signal lines in the typical example shown in the diagram of FIG. 10.

As an example, let attention be paid to the first and second row Bayer arrays. The following description additionally explains a way to read out pixel signals from the first and second row Bayer arrays. By making use of the horizontal signal line 204 (2, 1) as the first horizontal signal line, pixel signals can be read out from the G pixel 200 (3, 4) and the R pixel 200 (3, 5). In addition, by making use of the horizontal signal line 204 (1, 3) as the third horizontal signal line, pixel signals can be read out from the B pixel 200 (2, 4) and the G pixel 200 (2, 5).

The G pixel 200 (3, 4), the R pixel 200 (3, 5), the B pixel 200 (2, 4) and the G pixel 200 (2, 5) form a new Bayer array. Also in this case, even though the G pixel 200 (3, 4), the R pixel 200 (3, 5), the B pixel 200 (2, 4) and the G pixel 200 (2, 5) pertain to different Bayer arrays, these pixels can be used respectively as 4 pixels, i.e., G2, R, B and G1 pixels of the new Bayer array so that the new Bayer array can be created. Thus, processing can be carried out by forming a new Bayer array from the 4 pixels 200, that is, the G pixel 200 (3, 4), the R pixel 200 (3, 5), the B pixel 200 (2, 4) and the G pixel 200 (2, 5).

Figure 13:
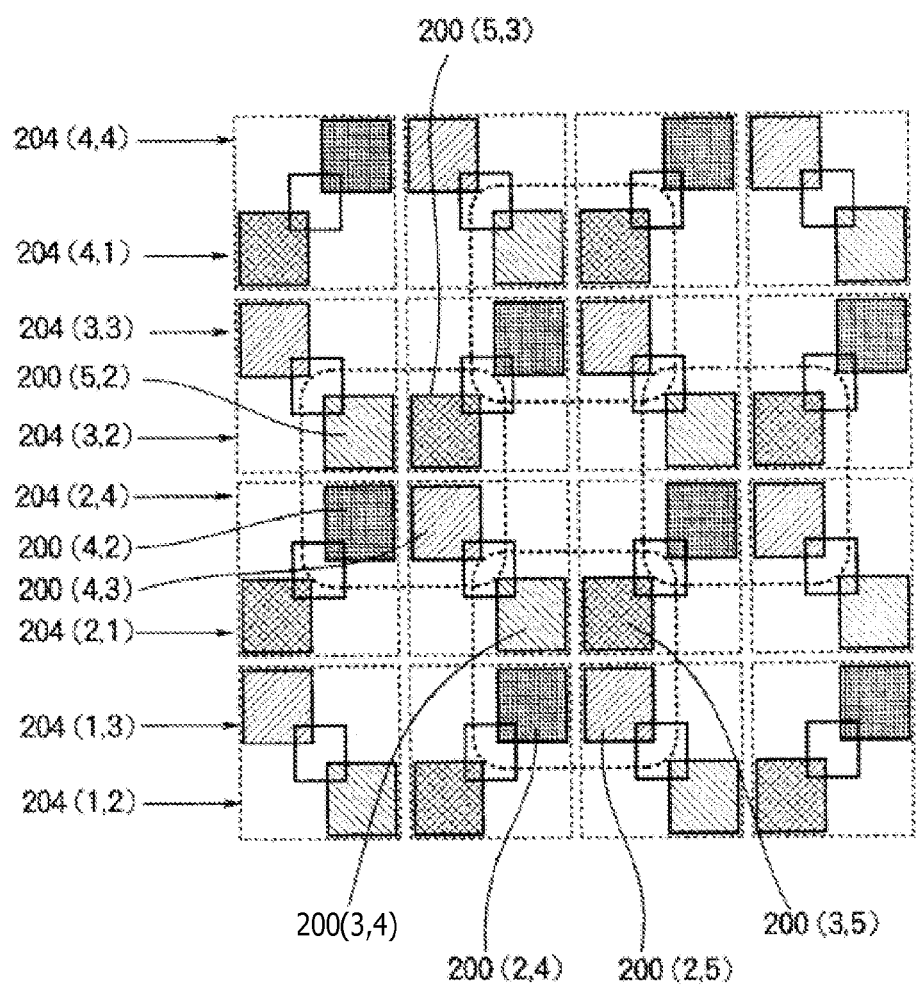
FIG. 13 is an explanatory diagram to be referred to in description of read operations carried out in a thinned-out read mode.

FIG. 13 is an explanatory diagram referred to in description of the number of read operations carried out in the ½ thinned-out read mode for a case in which the first to fourth horizontal signal lines are used. Pixel signals are read out from Bayer arrays by changing the horizontal signal line from array to array. That is to say, in an operation to read out a pixel signal from the first row Bayer array, the second and third horizontal signal lines are selected, in an operation to read out a pixel signal from the second row Bayer array, the first and fourth horizontal signal lines are selected, in an operation to read out a pixel signal from the third row Bayer array, the second and third horizontal signal lines are selected and, in an operation to read out a pixel signal from the fourth row Bayer array, the first and fourth horizontal signal lines are selected. In this case, in general, for a Bayer array denoted by a notation including an odd row number, the second and third horizontal signal lines are selected and, for a Bayer array denoted by a notation including an even row number, on the other hand, the first and fourth horizontal signal lines are selected.

As an example, let attention be paid to the first and second row Bayer arrays. The following description additionally explains a way to read out pixel signals from the first and second row Bayer arrays. By making use of the horizontal signal line 204 (2, 1) as the first horizontal signal line, pixel signals can be read out from the G pixel 200 (3, 4) and the R pixel 200 (3, 5). In addition, by making use of the horizontal signal line 204 (1, 3) as the third horizontal signal line, pixel signals can be read out from the B pixel 200 (2, 4) and the G pixel 200 (2, 5). By carrying out the read operations in this way, pixel signals of 1 Bayer array can be read out.

As described above, for a one-time read operation, the read operation is carried out by selecting the third horizontal signal line in the case of a Bayer array denoted by a notation including an odd row number and selecting the first horizontal signal line in the case of a Bayer array denoted by a notation including an even row number. In this way, a different horizontal signal line 204 can also be selected for each Bayer array.

In addition, by carrying out a read operation with the horizontal signal line 204 (3, 2) selected as the second horizontal signal line, pixel signals can be read out from the G pixel 200 (5, 2) and the R pixel 200 (5, 3). Moreover, by carrying out a read operation with the horizontal signal line 204 (2, 4) selected as the fourth horizontal signal line, pixel signals can be read out from the B pixel 200 (4, 2) and the G pixel 200 (4, 3).

As described above, in general, for a one-time read operation, the read operation is carried out by selecting the second horizontal signal line in the case of a Bayer array denoted by a notation including an odd row number and selecting the fourth horizontal signal line in the case of a Bayer array denoted by a notation including an even row number.

As described above, a horizontal signal line selected for the first read operation is different from a horizontal signal line selected for the second read operation whereas a horizontal signal line selected for a Bayer array denoted by a notation including an odd row number is different from a horizontal signal line selected for a Bayer array denoted by a notation including an even row number. Thus, in 2 read operations, pixel signals for 2 Bayer arrays can be read out. In addition, by carrying out read operations in this way, it is possible to make a Bayer array thinned out into a honeycomb shape.

The pixel electrodes of pixels including Bayer arrays are laid out and connected to horizontal signal lines as described above so that the number of read operations (that is, the number of scan operations) can be reduced. Thus, the time it takes to carry out all read operations can be shortened. As a result, the processing speed can be increased.

Second Embodiment

Figure 14:
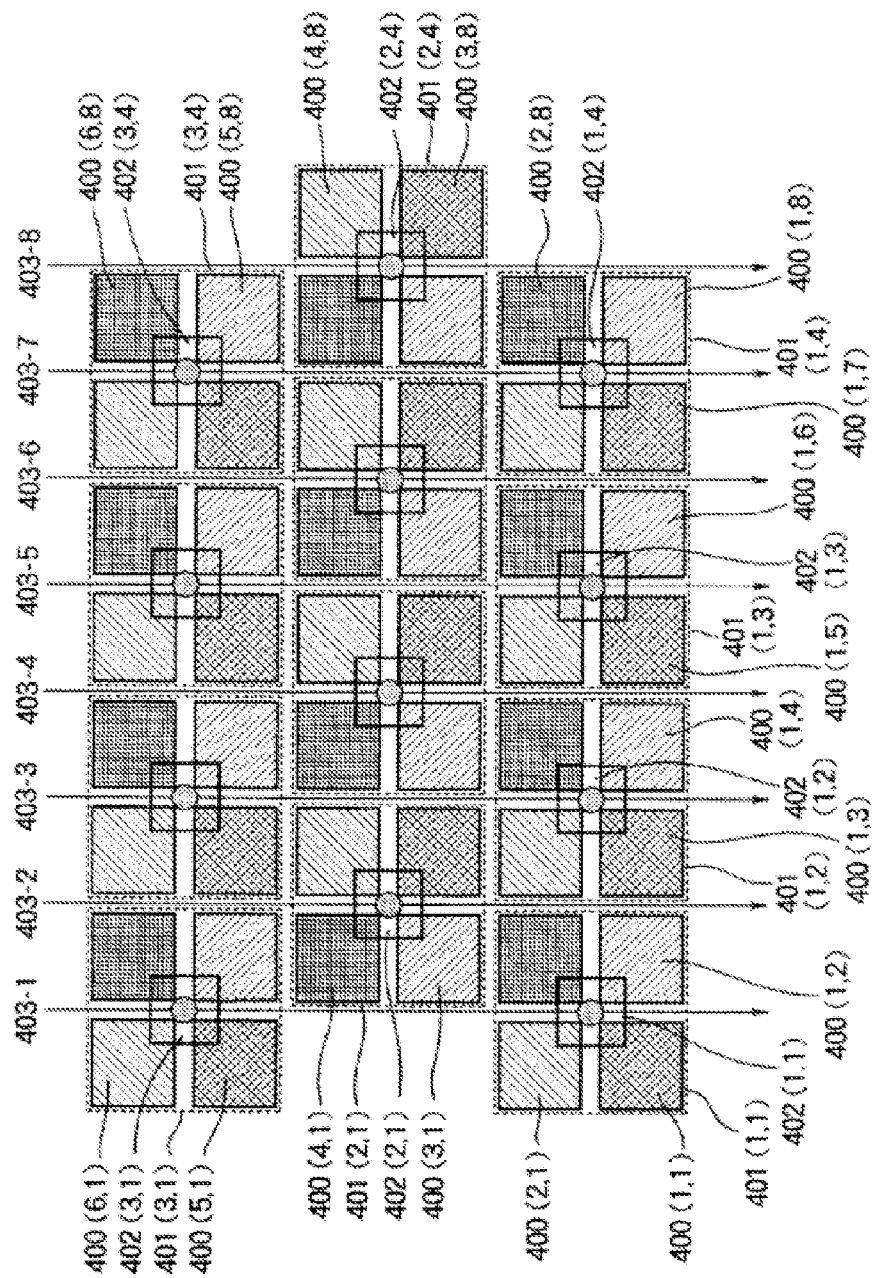
FIG. 14 is a diagram showing the configuration of an image sensor according to another embodiment of the present invention.

FIG. 14 is a diagram showing a typical configuration of an image sensor according to a second embodiment of the present invention. In the image sensor shown in the diagram of FIG. 14, shared pixels (a Bayer array) are laid out to form a honeycomb shape. Much like the first embodiment, 1 Bayer array is configured to have 4 pixels, i.e., R, G1, G2 and B pixels.

FIG. 14 shows a state of connections of R, G and B pixels at intersections of the first to sixth rows and the first to eighth columns. FIG. 14 shows a portion of the image sensor. However, the state of connections of R, G and B pixels at intersections of rows other than the first to sixth rows and columns other than the first to eighth columns is the same as the state of connections of R, G and B pixels at intersections of the first to sixth rows and the first to eighth columns.

The horizontal-direction configuration of the image sensor is explained as follows. It is to be noted that the horizontal direction is the direction from the left to the right in the diagram of FIG. 14. On the first row of the image sensor, an R pixel 400 (1, 1), a G pixel 400 (1, 2), an R pixel 400 (1, 3), a G pixel 400 (1, 4), an R pixel 400 (1, 5), a G pixel 400 (1, 6), an R pixel 400 (1, 7) and a G pixel 400 (1, 8) are laid out. By the same token, on the second row of the image sensor, a G pixel 400 (2, 1), a B pixel 400 (2, 2), a G pixel 400 (2, 3), a B pixel 400 (2, 4), a G pixel 400 (2, 5), a B pixel 400 (2, 6), a G pixel 400 (2, 7) and a B pixel 400 (2, 8) are laid out.

In addition, a Bayer array 401 (1, 1) is configured to have 4 pixels 400, i.e., an R pixel 400 (1, 1), a G pixel 400 (1, 2), a G pixel 400 (2, 1) and a B pixel 400 (2, 2). By the same token, a Bayer array 401 (1, 2) is configured to have 4 pixels 400, i.e., an R pixel 400 (1, 3), a G pixel 400 (1, 4), a G pixel 400 (2, 3) and a B pixel 400 (2, 4). Similarly, a Bayer array 401 (1, 3) is configured to have 4 pixels 400, i.e., an R pixel 400 (1, 5), a G pixel 400 (1, 6), a G pixel 400 (2, 5) and a B pixel 400 (2, 6). Likewise, a Bayer array 401 (1, 4) is configured to have 4 pixels 400, i.e., an R pixel 400 (1, 7), a G pixel 400 (1, 8), a G pixel 400 (2, 7) and a B pixel 400 (2, 8). The Bayer arrays 401 (1, 1), 401 (1, 2), 401 (1, 3) and 401 (1, 4) form the so-called first row Bayer array.

The second row Bayer array is placed above the first row Bayer array described above. Much like the first row Bayer array, on the first row of the second row Bayer array, a G pixel 400 (3, 1), an R pixel 400 (3, 2), a G pixel 400 (3, 3), an R pixel 400 (3, 4), a G pixel 400 (3, 5), an R pixel 400 (3, 6), a G pixel 400 (3, 7) and an R pixel 400 (3, 8) are laid out. By the same token, on the second row of the second row Bayer array, a B pixel 400 (4, 1), a G pixel 400 (4, 2), a B pixel 400 (4, 3), a G pixel 400 (4, 4), a B pixel 400 (4, 5), a G pixel 400 (4, 6), a B pixel 400 (4, 7) and a G pixel 400 (4, 8) are laid out.

In addition, a Bayer array 401 (2, 1) is configured to have 4 pixels 400, i.e., a G pixel 400 (3, 1), an R pixel 400 (3, 2), a B pixel 400 (4, 1) and a G pixel 400 (4, 2). By the same token, a Bayer array 401 (2, 2) is configured to have 4 pixels 400, i.e., a G pixel 400 (3, 3), an R pixel 400 (3, 4), a B pixel 400 (4, 3) and a G pixel 400 (4, 4). Similarly, a Bayer array 401 (2, 3) is configured to have 4 pixels 400, i.e., a G pixel 400 (3, 5), an R pixel 400 (3, 6), a B pixel 400 (4, 5) and a G pixel 400 (4, 6). Likewise, a Bayer array 401 (2, 4) is configured to have 4 pixels 400, i.e., a G pixel 400 (3, 7), an R pixel 400 (3, 8), a B pixel 400 (4, 7) and a G pixel 400 (4, 8). The Bayer arrays 401 (2, 1), 401 (2, 2), 401 (2, 3) and 401 (2, 4) form the second row Bayer array.

The second row Bayer array is placed at a location shifted away from the first row Bayer array by a distance of ½ the size of a Bayer array or the size of one pixel. That is to say, as shown in the diagram of FIG. 14, the Bayer array 401 (2, 1) of the second row Bayer array is placed at a location shifted away from the Bayer array 401 (1, 1) of the first row Bayer array by a distance of ½ the size of a Bayer array or the size of one pixel in the horizontal direction or the direction from the left to the right in the diagram of FIG. 14. With regard to pixel locations, the G pixel 400 (3, 1) of the Bayer array 401 (2, 1) of the second row Bayer array is placed at a position above the B pixel 400 (2, 2) of the Bayer array 401 (1, 1) of the first row Bayer array.

As described above, the first row of an even-numbered row Bayer array and the second row of an odd-numbered row Bayer array are separated from each other by a distance of ½ the size of a Bayer array or the size of one pixel. In addition, the array of pixels in a Bayer array composing an even-numbered row Bayer array is made different from the array of pixels in a Bayer array composing an odd-numbered row Bayer array. That is to say, the pixels in a Bayer array composing an odd-numbered row Bayer array are an R pixel on the lower left side, a G1 pixel on the lower right side, a G2 pixel on the upper left side and a B pixel on the upper right side. On the other hand, the pixels in a Bayer array composing an even-numbered row Bayer array are a G1 pixel on the lower left side, a R pixel on the lower right side, a B pixel on the upper left side and a G2 pixel on the upper right side.

The explanation with reference to the diagram of FIG. 14 is continued as follows. The third row Bayer array is placed above the second row Bayer array described above. Much like the second row Bayer arrays, on the first row of the third row Bayer array, an R pixel 400 (5, 1), a G pixel 400 (5, 2), an R pixel 400 (5, 3), a G pixel 400 (5, 4), an R pixel 400 (5, 5), a G pixel 400 (5, 6), an R pixel 400 (5, 7) and a G pixel 400 (5, 8) are laid out. By the same token, on the second row of the third row Bayer array, a G pixel 400 (6, 1), a B pixel 400 (6, 2), a G pixel 400 (6, 3), a B pixel 400 (6, 4), a G pixel 400 (6, 5), a B pixel 400 (6, 6), a G pixel 400 (6, 7) and a B pixel 400 (6, 8) are laid out.

In addition, a Bayer array 401 (3, 1) is configured to have 4 pixels 400, i.e., an R pixel 400 (5, 1), a G pixel 400 (5, 2), a G pixel 400 (6, 1) and a B pixel 400 (6, 2). By the same token, a Bayer array 401 (3, 2) is configured to have 4 pixels 400, i.e., an R pixel 400 (5, 3), a G pixel 400 (5, 4), a G pixel 400 (6, 3) and a B pixel 400 (6, 4). Similarly, a Bayer array 401 (3, 3) is configured to have 4 pixels 400, i.e., an R pixel 400 (5, 5), a G pixel 400 (5, 6), a G pixel 400 (6, 5) and a B pixel 400 (6, 6). Likewise, a Bayer array 401 (3, 4) is configured to have 4 pixels 400, i.e., an R pixel 400 (5, 7), a G pixel 400 (5, 8), a G pixel 400 (6, 7) and a B pixel 400 (6, 8).

The third row Bayer array is placed at a location separated away from the location of the second row Bayer array by a distance equal to ½ the size of a Bayer array (that is, the size of one pixel) as the second row Bayer array is placed at a location separated away from the location of the first row Bayer array by a distance equal to ½ the size of a Bayer array.

Next, a configuration constructed in the vertical direction is explained below. The vertical direction, which is the direction of the columns, is a direction from the top to the bottom in the diagram of FIG. 14. An R pixel 400 (1, 1), a G pixel 400 (2, 1), an R pixel 400 (5, 1) and a G pixel 400 (6, 1) are laid out along the first column. On this column, pixels composing the second Bayer array are not included. By the same token, a G pixel 400 (1, 2), a B pixel 400 (2, 2), a G pixel 400 (3, 1), a B pixel 400 (4, 1), a G pixel 400 (5, 2) and a B pixel 400 (6, 2) are laid out along the second column. This column includes pixels of the second column composing the first and third Bayer arrays and pixels of the first column composing the second Bayer array. The pixels on the first and second columns form a first column Bayer array.

In the diagram of FIG. 14, a second column Bayer array is provided on the right-hand side of the first column Bayer array. In the same way as the first column Bayer array, the second column Bayer array includes an R pixel 400 (1, 3), a G pixel 400 (2, 3), an R pixel 400 (3, 2), a G pixel 400 (4, 2), an R pixel 400 (5, 3) and a G pixel 400 (6, 3) which are laid out along the first column of the second column Bayer array as well as a G pixel 400 (1, 4), a B pixel 400 (2, 4), a G pixel 400 (3, 3), a B pixel 400 (4, 3), a G pixel 400 (5, 4) and a B pixel 400 (6, 4) which are laid out along the second column of the second column Bayer array.

In the diagram of FIG. 14, a third column Bayer array is provided on the right-hand side of the second column Bayer array. In the same way as the second column Bayer array, the third column Bayer array includes an R pixel 400 (1, 5), a G pixel 400 (2, 5), an R pixel 400 (3, 4), a G pixel 400 (4, 4), an R pixel 400 (5, 5) and a G pixel 400 (6, 5) which are laid out along the first column of the third column Bayer array as well as a G pixel 400 (1, 6), a B pixel 400 (2, 6), a G pixel 400 (3, 5), a B pixel 400 (4, 5), a G pixel 400 (5, 6) and a B pixel 400 (6, 6) which are laid out along the second column of the third column Bayer array.

In the diagram of FIG. 14, a fourth column Bayer array is provided on the right-hand side of the third column Bayer array. In the same way as the third column Bayer array, the fourth column Bayer array includes an R pixel 400 (1, 7), a G pixel 400 (2, 7), an R pixel 400 (3, 6), a G pixel 400 (4, 6), an R pixel 400 (5, 7) and a G pixel 400 (6, 7) which are laid out along the first column of the fourth column Bayer array as well as a G pixel 400 (1, 8), a B pixel 400 (2, 8), a G pixel 400 (3, 7), a B pixel 400 (4, 7), a G pixel 400 (5, 8) and a B pixel 400 (6, 8) which are laid out along the second column of the fourth column Bayer array.

In the image sensor shown in the diagram of FIG. 14, 4 pixels 400 pertaining to a Bayer array 401 share a common electrode 402 which is connected to a vertical signal line 403. To put it more concretely, a Bayer array 401 (1, 1) is provided with a common electrode 402 (1, 1) whereas a Bayer array 401 (1, 2) is provided with a common electrode 402 (1, 2). By the same token, a Bayer array 401 (1, 3) is provided with a common electrode 402 (1, 3) whereas a Bayer array 401 (1, 4) is provided with a common electrode 402 (1, 4).

In the same way, a Bayer array 401 (2, 1) is provided with a common electrode 402 (2, 1) whereas a Bayer array 401 (2, 2) is provided with a common electrode 402 (2, 2). Likewise, a Bayer array 401 (2, 3) is provided with a common electrode 402 (2, 3) whereas a Bayer array 401 (2, 4) is provided with a common electrode 402 (2, 4).

Similarly, a Bayer array 401 (3, 1) is provided with a common electrode 402 (3, 1) whereas a Bayer array 401 (3, 2) is provided with a common electrode 402 (3, 2). By the same token, a Bayer array 401 (3, 3) is provided with a common electrode 402 (3, 3) whereas a Bayer array 401 (3, 4) is provided with a common electrode 402 (3, 4).

The common electrode 402 (1, 1) of the Bayer array 401 (1, 1) and the common electrode 402 (3, 1) of the Bayer array 401 (3, 1) are connected to each other by a vertical signal line 403-1. The common electrode 402 (2, 1) of the Bayer array 401 (2, 1) is connected to a vertical signal line 403-2. The common electrode 402 (1, 2) of the Bayer array 401 (1, 2) and the common electrode 402 (3, 2) of the Bayer array 401 (3, 2) are connected to each other by a vertical signal line 403-3. The common electrode 402 (2, 2) of the Bayer array 401 (2, 2) is connected to a vertical signal line 403-4.

The common electrode 402 (1, 3) of the Bayer array 401 (1, 3) and the common electrode 402 (3, 3) of the Bayer array 401 (3, 3) are connected to each other by a vertical signal line 403-5. The common electrode 402 (2, 3) of the Bayer array 401 (2, 3) is connected to a vertical signal line 403-6. The common electrode 402 (1, 4) of the Bayer array 401 (1, 4) and the common electrode 402 (3, 4) of the Bayer array 401 (3, 4) are connected to each other by a vertical signal line 403-7. The common electrode 402 (2, 4) of the Bayer array 401 (2, 4) is connected to a vertical signal line 403-8.

As described above, a Bayer array 401 denoted by a notation including an odd column number is connected to a vertical signal line 403 different from a vertical signal line 403 connected to a Bayer array 401 denoted by a notation including an even column number.

Figure 15:
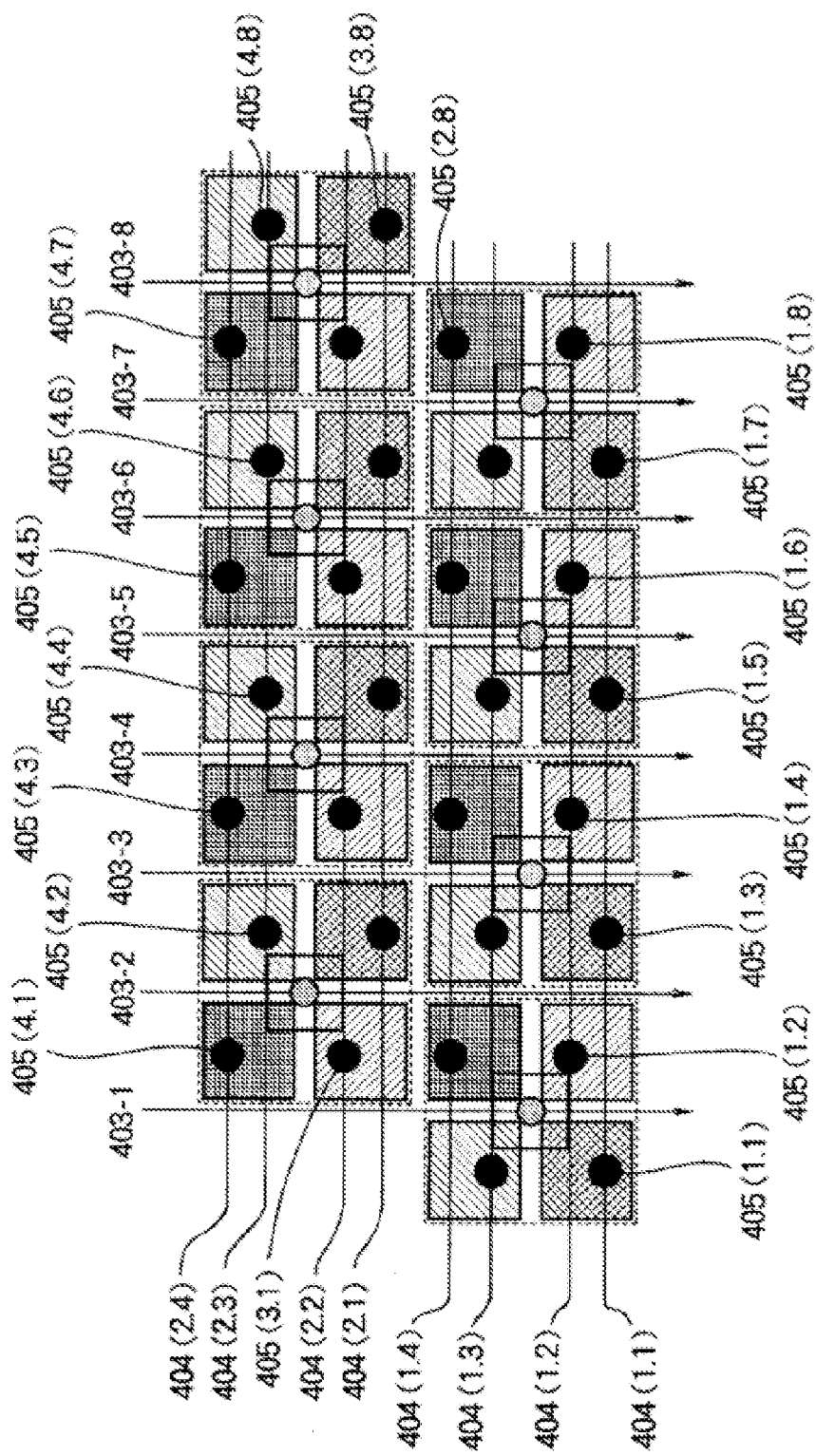
FIG. 15 is an explanatory diagram to be referred to in description of the layout of pixel electrodes in an image sensor.
Figure 16:
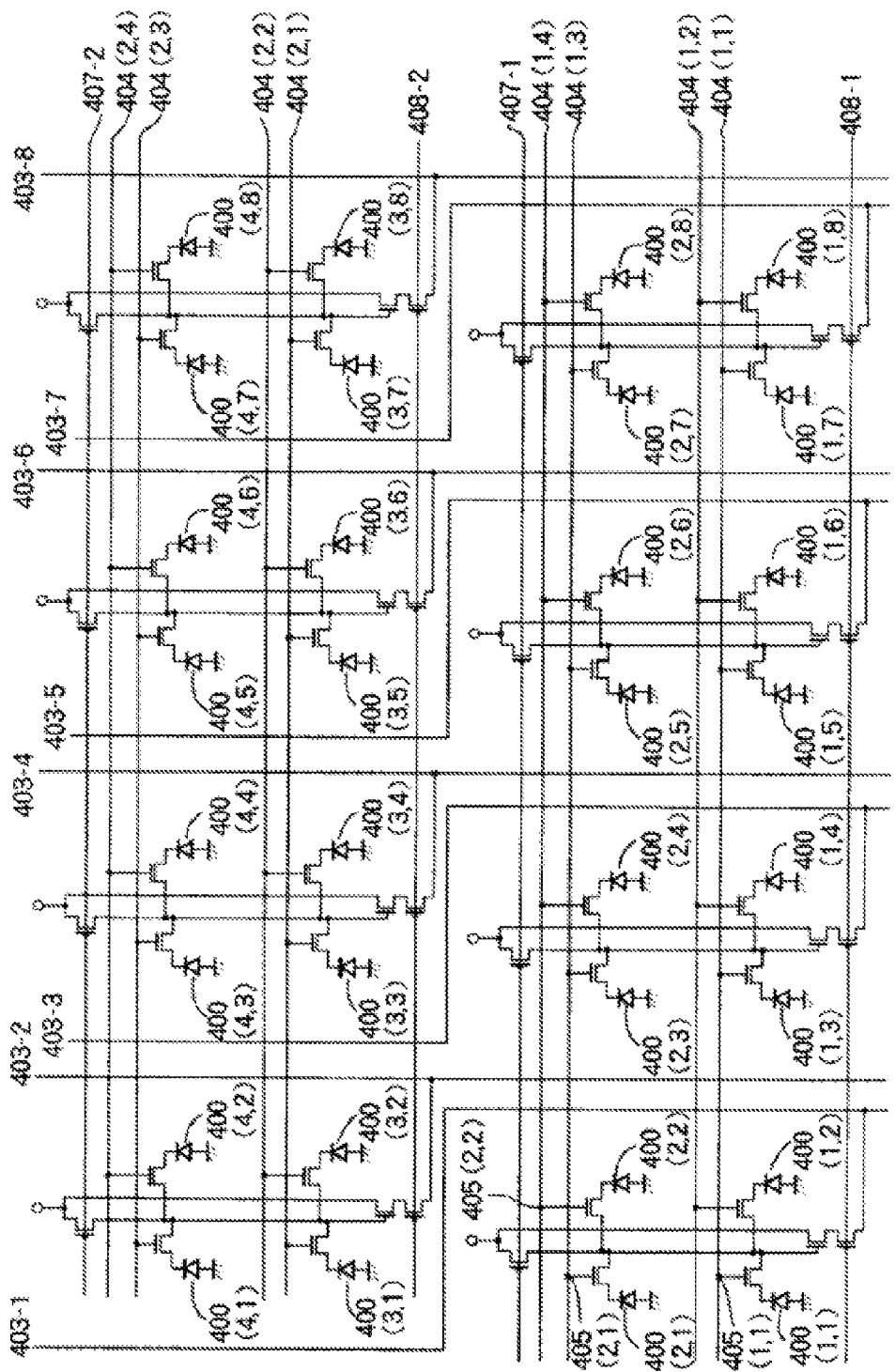
FIG. 16 is a circuit diagram showing the image sensor shown in the diagram of FIG. 15.

Every pixel 400 is provided with a pixel electrode 405 which is connected to a horizontal signal line 404. The locations of the pixel electrodes 405 of pixels 400 are explained by referring to diagrams of FIGS. 15 and 16. The diagram of FIG. 15 is obtained by extracting the first and second row Bayer arrays from the image sensor shown in the diagram of FIG. 14. FIG. 16 is a diagram showing the circuit of the image-sensor portion shown in the diagram of FIG. 15.

The pixel electrodes 405 (1, 1), 405 (1, 3), 405 (1, 5) and 405 (1, 7) of the R pixels 400 (1, 1), 400 (1, 3), 400 (1, 5) and 400 (1, 7) respectively which are laid out on the first row of the first row Bayer array are connected to each other by the horizontal signal line 404 (1, 1). By the same token, the pixel electrodes 405 (1, 2), 405 (1, 4), 405 (1, 6) and 405 (1, 8) of the G pixels 400 (1, 2), 400 (1, 4), 400 (1, 6) and 400 (1, 8) respectively which are laid out on the first row of the first row Bayer array are connected to each other by the horizontal signal line 404 (1, 2).

In the same way, the pixel electrodes 405 (2, 1), 405 (2, 3), 405 (2, 5) and 405 (2, 7) of the G pixels 400 (2, 1), 400 (2, 3), 400 (2, 5) and 400 (2, 7) respectively which are laid out on the second row of the first row Bayer array are connected to each other by the horizontal signal line 404 (1, 3). By the same token, the pixel electrodes 405 (2, 2), 405 (2, 4), 405 (2, 6) and 405 (2, 8) of the B pixels 400 (2, 2), 400 (2, 4), 400 (2, 6) and 400 (2, 8) respectively which are laid out on the second row of the first row Bayer array are connected to each other by the horizontal signal line 404 (1, 4).

In the same way, the pixel electrodes 405 (3, 1), 405 (3, 3), 405 (3, 5) and 405 (3, 7) of the G pixels 400 (3, 1), 400 (3, 3), 400 (3, 5) and 400 (3, 7) respectively which are laid out on the first row of the second row Bayer array are connected to each other by the horizontal signal line 404 (2, 1). By the same token, the pixel electrodes 405 (3, 2), 405 (3, 4), 405 (3, 6) and 405 (3, 8) of the R pixels 400 (3, 2), 400 (3, 4), 400 (3, 6) and 400 (3, 8) respectively which are laid out on the first row of the second row Bayer array are connected to each other by the horizontal signal line 404 (2, 2).

In the same way, the pixel electrodes 405 (4, 1), 405 (4, 3), 405 (4, 5) and 405 (4, 7) of the B pixels 400 (4, 1), 400 (4, 3), 400 (4, 5) and 400 (4, 7) respectively which are laid out on the second row of the second row Bayer array are connected to each other by the horizontal signal line 404 (2, 3). By the same token, the pixel electrodes 405 (4, 2), 405 (4, 4), 405 (4, 6) and 405 (4, 8) of the G pixels 400 (4, 2), 400 (4, 4), 400 (4, 6) and 400 (4, 8) respectively which are laid out on the second row of the second row Bayer array are connected to each other by the horizontal signal line 404 (2, 4).

The relations between the pixel electrodes 405 of pixels 400 and the horizontal signal lines 404 are explained by again referring to the diagrams of FIGS. 14 and 15 as follows.

Let attention be paid to the Bayer array 401 (1, 1). The pixel electrode 405 (1, 1) of the R pixel 400 (1, 1) is placed on the lower side in the R pixel 400 (1, 1) whereas the pixel electrode 405 (1, 2) of the G pixel 400 (1, 2) adjacent to the R pixel 400 (1, 1) in the row direction is placed on the upper side in the G pixel 400 (1, 2). By the same token, the pixel electrode 405 (2, 1) of the G pixel 400 (2, 1) is placed on the lower side in the G pixel 400 (2, 1) whereas the pixel electrode 405 (2, 2) of the B pixel 400 (2, 2) adjacent to the G pixel 400 (2, 1) in the row direction is placed on the upper side in the B pixel 400 (2, 2).

That is to say, the pixel electrode 405 of any specific pixel 400 in a Bayer array 401 is placed on a side opposite to the side in the pixel electrode 405 of another pixel 400 adjacent to the specific pixel 400 in the row direction in same Bayer array 401. In addition, the pixel electrode 405 of any specific pixel 400 in a Bayer array 401 is connected to a horizontal signal line 404 different from a horizontal signal line 404 connected to the pixel electrode 405 of another pixel 400 adjacent to the specific pixel 400 in the row direction in same Bayer array 401.

Let attention be paid to the Bayer array 401 (1, 1). The pixel electrode 405 (1, 1) of the R pixel 400 (1, 1) is placed on the lower side in the R pixel 400 (1, 1) and the pixel electrode 405 (1, 2) of the G pixel 400 (2, 1) adjacent to the R pixel 400 (1, 1) in the column direction is placed also on the lower side in the G pixel 400 (2, 1). By the same token, the pixel electrode 405 (1, 2) of the G pixel 400 (1, 2) is placed on the upper side in the G pixel 400 (1, 2) and the pixel electrode 405 (2, 2) of the B pixel 400 (2, 2) adjacent to the G pixel 400 (1, 2) in the column direction is placed also on the upper side in the B pixel 400 (2, 2).

That is to say, the pixel electrode 405 of any specific pixel 400 in a Bayer array 401 is placed on the same side as the pixel electrode 405 of another pixel 400 adjacent to the specific pixel 400 in the column direction in the same Bayer array 401. In addition, the pixel electrode 405 of any specific pixel 400 in a Bayer array 401 is connected to a horizontal signal line 404 different from a horizontal signal line 404 connected to the pixel electrode 405 of another pixel 400 adjacent to the specific pixel 400 in the column direction in the same Bayer array 401.

The relations between the location of the pixel electrode 405 of any specific pixel 400 in a Bayer array 401 and the location of the pixel electrode 405 of another pixel 400 adjacent to the specific pixel 400 in the column and row directions in the same Bayer array 401 have been described above.

The following description explains a relation between the location of the pixel electrode 405 of a specific pixel 400 in a specific Bayer array 401 and the location of the pixel electrode 405 of another pixel 400 included in another Bayer array 401 adjacent to the specific Bayer array 401 in the row direction to serve as another pixel 400 adjacent to the specific pixel 400 in the row direction. Let the Bayer arrays 401 (1, 1) and 401 (1, 2) be taken as an example of Bayer arrays adjacent to each other in the row direction. The pixel electrode 405 (1, 2) of the G pixel 400 (1, 2) in the Bayer array 401 (1, 1) is placed on the upper side in the G pixel 400 (1, 2) whereas the pixel electrode 405 (1, 3) of the R pixel 400 (1, 3) included in the Bayer array 401 (1, 2) adjacent to the Bayer array 401 (1, 1) in the row direction to serve as an R pixel 400 adjacent to the G pixel 400 (1, 2) in the row direction is placed on the lower side in the R pixel 400 (1, 3).

By the same token, the pixel electrode 405 (2, 2) of the B pixel 400 (2, 2) in the Bayer array 401 (1, 1) is placed on the upper side in the B pixel 400 (2, 2) whereas the pixel electrode 405 (2, 3) of the G pixel 400 (2, 3) included in the Bayer array 401 (1, 2) adjacent to the Bayer array 401 (1, 1) in the row direction to serve as a G pixel 400 adjacent to the B pixel 400 (2, 2) in the row direction is placed on the lower side in the R pixel 400 (2, 3).

As described above, the pixel electrode 405 of a specific pixel 400 in a specific Bayer array 401 is placed on a side opposite to the location of the pixel electrode 405 of another pixel 400 included in another Bayer array 401 adjacent to the specific Bayer array 401 in the row direction to serve as another pixel 400 adjacent to the specific pixel 400 in the row direction. In addition, the pixel electrode 405 of a specific pixel 400 in a specific Bayer array 401 is connected to a horizontal signal line 404 different from the horizontal signal line 404 connected to the location of the pixel electrode 405 of another pixel 400 included in another Bayer array 401 adjacent to the specific Bayer array 401 in the row direction to serve as another pixel 400 adjacent to the specific pixel 400 in the row direction.

The following description explains a relation between the location of the pixel electrode 405 of a specific pixel 400 in a specific Bayer array 401 and the location of the pixel electrode 405 of another pixel 400 included in another Bayer array 401 adjacent to the specific Bayer array 401 in the column direction to serve as another pixel 400 adjacent to the specific pixel 400 in the column direction. Let the Bayer arrays 401 (1, 1) and 401 (2, 1) be taken as an example of Bayer arrays adjacent to each other in the column direction. Even though the locations of the Bayer arrays 401 (1, 1) and 401 (2, 1) are separated away from each other by a distance equal to half the size of the Bayer array, the locations of the Bayer arrays 401 (1, 1) and 401 (2, 1) are separated away from each other in the column direction. Thus, the Bayer arrays 401 (1, 1) and 401 (2, 1) are taken as an example of adjacent Bayer arrays.

The locations of the pixel electrodes 405 of the pixels 400 in the Bayer array 401 (1, 1) are the mirror image of the locations of the pixel electrodes 405 of the pixels 400 in the Bayer array 401 (2, 1).

To put it more concretely, the pixel electrode 405 (1, 1) of the R pixel 400 (1, 1) on the left lower side in the Bayer array 401 (1, 1) is placed on the lower side in the R pixel 400 (1, 1) whereas the pixel electrode 405 (3, 1) of the G pixel 400 (3, 1) on the left upper side in the Bayer array 401 (2, 1) is placed on the upper side in the G pixel 400 (3, 1).

The pixel electrode 405 (1, 2) of the G pixel 400 (1, 2) on the right lower side in the Bayer array 401 (1, 1) is placed on the upper side in the G pixel 400 (1, 2) whereas the pixel electrode 405 (3, 2) of the R pixel 400 (3, 2) on the right lower side in the Bayer array 401 (2, 1) is placed on the lower side in the R pixel 400 (3, 2).

The pixel electrode 405 (2, 1) of the G pixel 400 (2, 1) on the left upper side in the Bayer array 401 (1, 1) is placed on the lower side in the G pixel 400 (2, 1) whereas the pixel electrode 405 (4, 1) of the B pixel 400 (4, 1) on the left upper side in the Bayer array 401 (2, 1) is placed on the upper side in the B pixel 400 (4, 1).

The pixel electrode 405 (2, 2) of the B pixel 400 (2, 2) on the right upper side in the Bayer array 401 (1, 1) is placed on the upper side in the B pixel 400 (2, 2) whereas the pixel electrode 405 (4, 2) of the G pixel 400 (4, 2) on the right upper side in the Bayer array 401 (2, 1) is placed on the lower side in the R pixel 400 (4, 2).

As described above, any specific pixel 400 of a specific Bayer array 401 is placed on a side opposite to the side on which a counterpart pixel 400 is included in a Bayer array 401 adjacent to the specific Bayer array 401 in the column direction to serve as the counterpart to the specific pixel 400.

The pixel electrode 405 of every pixel 400 is placed at a location and connected to a horizontal signal line 404 as described above. The following description explains an operation to read out a pixel signal from the image sensor shown in the diagram of FIG. 15 or 16.

Figure 17:
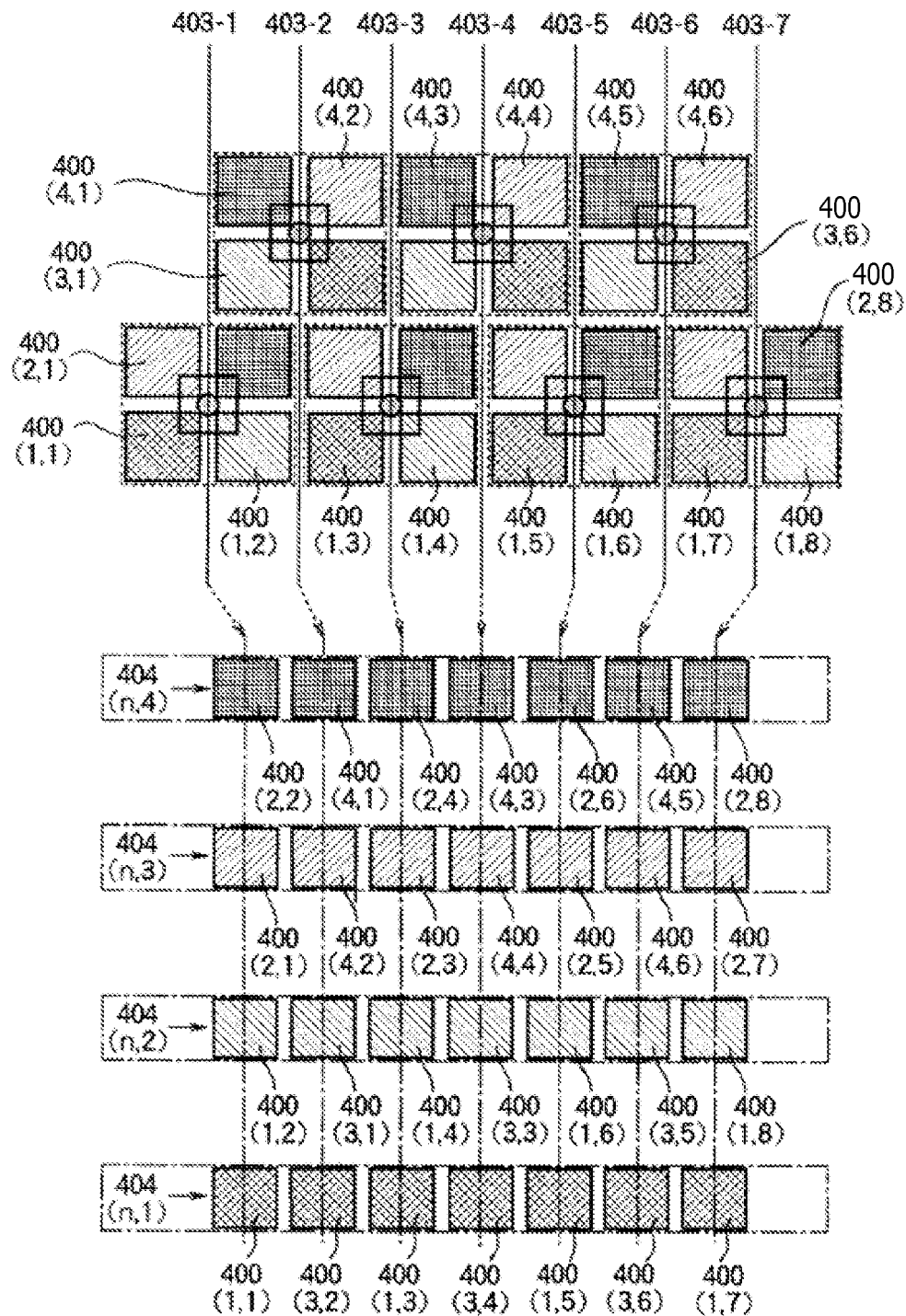
FIG. 17 is an explanatory diagram to be referred to in description of read operations carried out in an all-pixel read mode.

FIG. 17 is an explanatory circuit diagram referred to in description of a read operation carried out in an all-pixel read mode. First of all, a horizontal signal line 404 (r, 1) is selected and a pixel signal is read out from every pixel 400 connected to the horizontal signal line 404 (r, 1). In the typical circuit diagram of FIG. 17, subscript r of notation 404 (r, 1) denoting a horizontal signal line has a value of 1 or 2. That is to say, the horizontal signal line 404 (r, 1) is the horizontal signal line 404 (1, 1) or the horizontal signal line 404 (2, 1). Notation r having such values is used in the following description.

When the horizontal signal line 404 (r, 1) is selected, the pixel signal of the R pixel 400 (1, 1) is read out from a vertical signal line 403-1, the pixel signal of the R pixel 400 (3, 2) is read out from a vertical signal line 403-2, the pixel signal of the R pixel 400 (1, 3) is read out from a vertical signal line 403-3, the pixel signal of the R pixel 400 (3, 4) is read out from a vertical signal line 403-4, the pixel signal of the R pixel 400 (1, 5) is read out from a vertical signal line 403-5, the pixel signal of the R pixel 400 (3, 6) is read out from a vertical signal line 403-6 and the pixel signal of the R pixel 400 (1, 7) is read out from a vertical signal line 403-7. That is to say, in this case, when the horizontal signal line 404 (r, 1) is selected, a pixel signal of an R pixel 400 is read out from every Bayer array.

Next, when the horizontal signal line 404 (r, 2) is selected, the pixel signal of the G pixel 400 (1, 2) is read out from the vertical signal line 403-1, the pixel signal of the G pixel 400 (3, 1) is read out from the vertical signal line 403-2, the pixel signal of the G pixel 400 (1, 4) is read out from the vertical signal line 403-3, the pixel signal of the G pixel 400 (3, 3) is read out from the vertical signal line 403-4, the pixel signal of the G pixel 400 (1, 6) is read out from the vertical signal line 403-5, the pixel signal of the G pixel 400 (3, 5) is read out from the vertical signal line 403-6 and the pixel signal of the G pixel 400 (1, 8) is read out from the vertical signal line 403-7. That is to say, in this case, when the horizontal signal line 404 (r, 2) is selected, a pixel signal of a G1 pixel 400 is read out from every Bayer array.

Next, when the horizontal signal line 404 (r, 3) is selected, the pixel signal of the G pixel 400 (2, 1) is read out from the vertical signal line 403-1, the pixel signal of the G pixel 400 (4, 2) is read out from the vertical signal line 403-2, the pixel signal of the G pixel 400 (2, 3) is read out from the vertical signal line 403-3, the pixel signal of the G pixel 400 (4, 4) is read out from the vertical signal line 403-4, the pixel signal of the G pixel 400 (2, 5) is read out from the vertical signal line 403-5, the pixel signal of the G pixel 400 (4, 6) is read out from the vertical signal line 403-6 and the pixel signal of the G pixel 400 (2, 7) is read out from the vertical signal line 403-7. That is to say, in this case, when the horizontal signal line 404 (r, 3) is selected, a pixel signal of a G2 pixel 400 is read out from every Bayer array.

Next, when the horizontal signal line 404 (r, 4) is selected, the pixel signal of the B pixel 400 (2, 2) is read out from the vertical signal line 403-1, the pixel signal of the B pixel 400 (4, 1) is read out from the vertical signal line 403-2, the pixel signal of the B pixel 400 (2, 4) is read out from the vertical signal line 403-3, the pixel signal of the B pixel 400 (4, 3) is read out from the vertical signal line 403-4, the pixel signal of the B pixel 400 (2, 6) is read out from the vertical signal line 403-5, the pixel signal of the B pixel 400 (4, 5) is read out from the vertical signal line 403-6 and the pixel signal of the B pixel 400 (2, 8) is read out from the vertical signal line 403-7. That is to say, in this case, when the horizontal signal line 404 (r, 4) is selected, a pixel signal of a B pixel 400 is read out from every Bayer array.

By sequentially selecting a horizontal signal line among the horizontal signal line 404 (r, 1), the horizontal signal line 404 (r, 2), the horizontal signal line 404 (r, 3) and the horizontal signal line 404 (r, 4), the pixel signals of the R, G1, G2 and B pixels composing 1 Bayer array can be read out sequentially. That is to say, in this case, in 4 horizontal scan operations, the read operation can be carried out.

Figure 18:
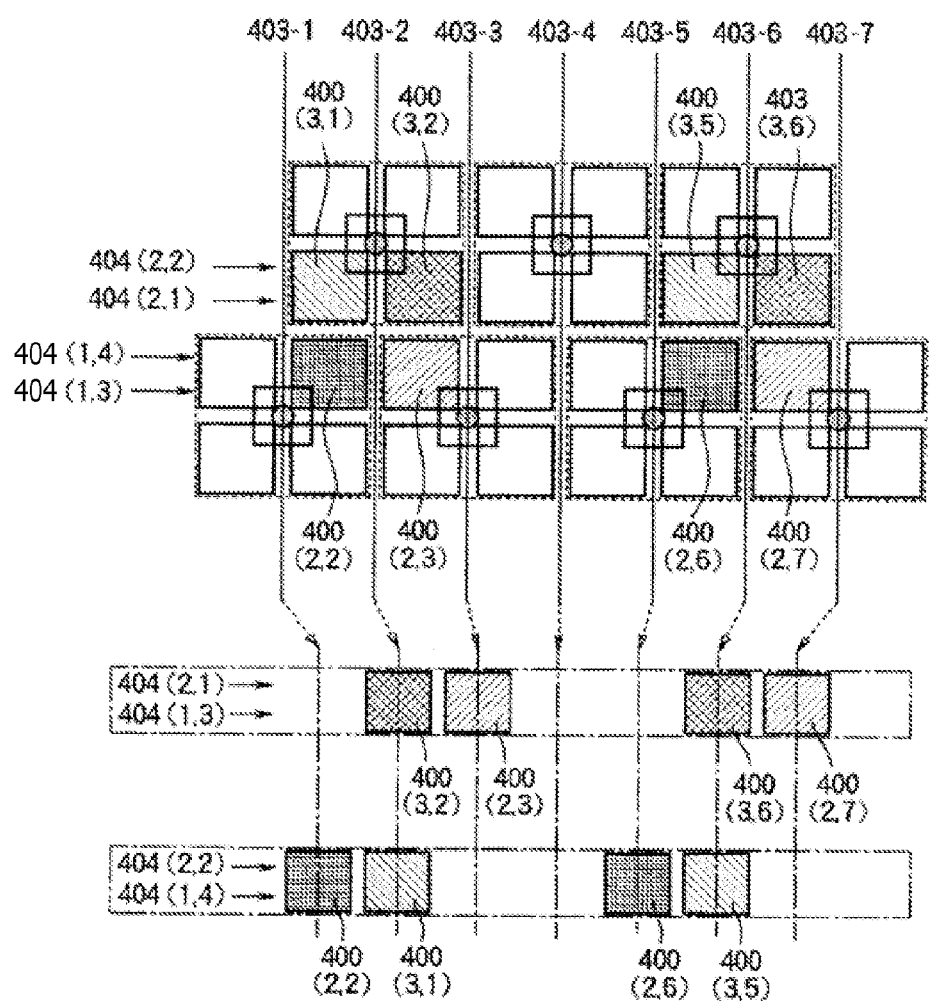
FIG. 18 is an explanatory diagram to be referred to in description of read operations carried out in a thinned-out read mode.

By referring to a diagram of FIG. 18, the following description explains read operations carried out in a thinned-out read mode.

In the first read operation carried out in a thinned-out read mode, the horizontal signal line 404 (r, 4) used as the fourth horizontal signal line is selected for a Bayer array denoted by a notation including an odd column number whereas the horizontal signal line 404 (r, 2) used as the second horizontal signal line is selected for a Bayer array denoted by a notation including an even column number. In the typical example shown in the diagram of FIG. 18, Bayer arrays each denoted by a notation including an odd column number are the Bayer array 401 (1, 1), the Bayer array 401 (1, 2), the Bayer array 401 (1, 3) and the Bayer array 401 (1, 4) whereas Bayer arrays each denoted by a notation including an even column number are the Bayer array 401 (2, 1), the Bayer array 401 (2, 2) and the Bayer array 401 (2, 3).

By selecting the horizontal signal line 404 (r, 4) and the horizontal signal line 404 (r, 2), the pixel signal of the B pixel 400 (2, 2) is read out from the vertical signal line 403-1, the pixel signal of the G pixel 400 (3, 1) is read out from the vertical signal line 403-2, no pixel signals are read out from the vertical signal lines 403-3 and 403-4, the pixel signal of the B pixel 400 (2, 6) is read out from the vertical signal line 403-5, the pixel signal of the G pixel 400 (3, 5) is read out from the vertical signal line 403-6 and no pixel signal is read out from the vertical signal line 403-7.

That is to say, in this case, by selecting the horizontal signal line 404 (r, 4), the pixel signal of every B pixel 400 is read out from every Bayer array denoted by a notation including an odd column number and, by selecting the horizontal signal line 404 (r, 2), the pixel signal of every G1 pixel 400 is read out from every Bayer array denoted by a notation including an even column number. In addition, no pixel signal is read out from a vertical signal line 403 not demanded in formation of a new Bayer array 401.

In the second read operation carried out in a thinned-out read mode, the horizontal signal line 404 (r, 3) used as the third horizontal signal line is selected for a Bayer array denoted by a notation including an odd column number whereas the horizontal signal line 404 (r, 1) used as the first horizontal signal line is selected for a Bayer array denoted by a notation including an even column number.

By selecting the horizontal signal line 404 (r, 3) and the horizontal signal line 404 (r, 1), no pixel signal is read out from the vertical signal line 403-1, the pixel signal of the R pixel 400 (3, 2) is read out from the vertical signal line 403-2, the pixel signal of the G pixel 400 (2, 3) is read out from the vertical signal line 403-3, no pixel signal is read out from the vertical signal lines 403-4 and 403-5, the pixel signal of the R pixel 400 (3, 6) is read out from the vertical signal line 403-6 and the pixel signal of the G pixel 400 (2, 7) is read out from the vertical signal line 403-7.

That is to say, in this case, by selecting the horizontal signal line 404 (r, 3), the pixel signal of every G2 pixel 400 is read out from every Bayer array denoted by a notation including an odd column number and, by selecting the horizontal signal line 404 (r, 1), the pixel signal of every R pixel 400 is read out from every Bayer array denoted by a notation including an even column number. In addition, no pixel signal is read out from a vertical signal line 403 not demanded in formation of a new Bayer array 401.

As described above, by carrying out two scan operations, the pixel signals of an R pixel 400, a G1 pixel 400, a G2 pixel 400 and a B pixel 400 which form a new Bayer array 401 are each read out. That is to say, in this case, the pixels forming the new Bayer array 401 are a pixel 400 (3, 2) serving as the R pixel, a G pixel 400 (3, 1) serving as the G1 pixel, a G pixel 400 (2, 3) serving as the G2 pixel and a pixel 400 (2, 2) serving as the B pixel. By the same token, in this case, a pixel 400 (3, 6) serving as the R pixel, a G pixel 400 (3, 5) serving as the G1 pixel, a G pixel 400 (2, 7) serving as the G2 pixel and a pixel 400 (2, 6) serving as the B pixel also form a new Bayer array 401.

As described above, in a read operation carried out in thinned-out read mode, a horizontal signal line 404 selected for a Bayer array 401 denoted by a notation including an odd column number is different from a horizontal signal line 404 selected for a Bayer array 401 denoted by a notation including an even column number so that, by selecting a vertical signal line 403 for reading out the pixel signal of a desired pixel 400, the pixel signals of the four pixels composing a Bayer array 401 can be read out in 2 read operations.

This read processing can be carried out half the number of times demanded in the past by the existing image sensor as for example explained before by referring to the diagram of FIG. 5B.

In the typical example shown in the diagram of FIG. 18, the horizontal signal lines 404 (r, 3) and (r, 4) are used as horizontal signal lines for a Bayer array 401 denoted by a notation including an odd column number whereas the horizontal signal lines 404 (r, 1) and (r, 2) are used as horizontal signal lines for a Bayer array 401 denoted by a notation including an even column number. It is to be noted, however, that combinations of the horizontal signal lines 404 bare by no means limited to this example. That is to say, other combinations of the horizontal signal lines 404 are also possible. In addition, even in the case of another combination, 2 read operations in the thinned-out read mode are carried out in the same way as what is described above.

It is to be noted that, in the embodiments described above, a Bayer array has 4 pixels, i.e., an R (red color) pixel, a G1 (first green color) pixel, a G2 (second green color) pixel and a B (blue color) pixel. However, a complementary-color pixel can also be used.

By adopting the pixel-electrode layouts described above and making use of the read method explained above, horizontal signal lines are connected to pixels as lines for selecting some of the pixels in a way that varies from row to row. In addition, by connecting the horizontal signal lines to the pixels in a way that varies from row to row, pixels each serving as a subject of the read operation can also be changed from row to row. Thus, the speed of the read operation carried out in the thinned-out read mode can be made high in comparison with the speed for the existing connection method. For example, the speed of the read operation carried out in the thinned-out read mode can be made at least twice the speed for the existing connection method.

In addition, in the vertical and horizontal directions, following the ½ thinned-out process, a new Bayer array crossing the border between Bayer arrays existing prior to the ½ thinned-out process can be created.

On top of that, by changing the read operation order of the horizontal signal lines, the ½ thinned-out read mode can be applied only in the vertical direction.

In addition, by implementing the pixel sharing in a honeycomb state, the number of vertical signal lines can be doubled. With such an arrangement, each of the pixel thinned-out read operation and the addition (in both the horizontal and vertical directions) can be carried out at a high speed.

On top of that, in the case of read operations carried out in the thinned-out read mode, the number of read operations can be reduced. Thus, the amount of power demanded in the read operations can be decreased. As a result, the power consumption of the entire image processing apparatus can be reduced.

In addition, the image processing apparatus can be switched from a process to another with ease. Typical examples of the process are a read operation carried out in an all-pixel read mode, a pixel addition process and a read operation carried out in a thinned-out read mode.

The embodiments described above can also be applied to a Bayer array system rotated by 45 degrees. Also in the case of a Bayer array system rotated by 45 degrees, by applying the present embodiment, the same effects as those described previously can be expected.

As described above, the image processing apparatus serving as an image sensor provided by the present embodiment is that pixel electrodes of pixels employed in the sensor are laid out in accordance with a layout technique peculiar to the sensor and connected to horizontal signal lines also in accordance with a connection technique peculiar to the sensor. A manufacturing apparatus for manufacturing an image sensor having such characteristics is also included in a range to which the present invention can be applied.

To put it more concretely, the image sensor has a plurality of Bayer arrays each including 4 pixels sharing a common electrode connected to a vertical signal line. Each of the 4 pixels composing a Bayer array is provided with a pixel electrode which is connected to a horizontal signal line. The locations of pixel electrodes each connected to a horizontal signal line in any specific Bayer array are a mirror image of the locations of pixel electrodes each connected to a horizontal signal line in another Bayer array adjacent to the specific Bayer array. A manufacturing apparatus for manufacturing an image sensor having such characteristics is also included in the range of the present invention.

It is to be noted that implementations of the present invention are by no means limited to the embodiments described above. That is to say, the embodiments can be changed to a variety of modified versions within a range not deviating from essentials of the present invention.

In addition, it should be understood by those skilled in the art that a variety of modifications, combinations, sub-combinations and alterations may occur, depending on design demands and other factors insofar as they are within the scope of the appended claims or the equivalents thereof.

What is claimed is:

1. An imaging device, comprising:
a plurality of pixel arrays, wherein each of the pixel arrays includes a plurality of pixels arranged in a two by two array;
a plurality of vertical signal lines;
a plurality of horizontal signal lines;
a plurality of common electrodes, wherein each pixel array is electrically connected to one of the common electrodes, wherein each of the common electrodes is electrically connected to a vertical signal line, and wherein for each pixel array the corresponding common electrode is at a center of the two by two array;
a plurality of pixel electrodes, wherein each pixel in the plurality of pixels is electrically connected to a pixel electrode, wherein for each pixel array each of the pixel electrodes is connected to a different horizontal signal line, wherein a first pixel in a first pixel array is connected to a first horizontal signal line by a first pixel electrode, wherein a first pixel in a second pixel array and neighboring the first pixel in the first pixel array in a first horizontal direction is connected to the first horizontal signal line by a second pixel electrode, and wherein a color of the first pixel is different than a color of the second pixel.

2. The device of claim 1, wherein a second pixel in the first pixel array and neighboring the first pixel in the first pixel array in a second horizontal direction is connected to a second horizontal signal line.

3. The device of claim 2, wherein the first pixel in the second pixel array and the second pixel in the first pixel array have a first color.

4. The device of claim 3, wherein a second pixel in the second pixel array and neighboring the first pixel in the second pixel array in the first horizontal direction is connected to the second horizontal signal line.

5. The device of claim 4, wherein a third pixel in the first pixel array and neighboring the first pixel in the first pixel array in a first vertical direction is connected to a third horizontal signal line.

6. The device of claim 5, wherein a third pixel in the second pixel array and neighboring the first pixel of the second pixel array in the first vertical direction is connected to the third horizontal signal line.

7. The device of claim 6, wherein a fourth pixel in the first pixel array and neighboring the second pixel in the first pixel array in the first vertical direction is connected to a fourth horizontal signal line.

8. The device of claim 7, wherein a fourth pixel in the second pixel array and neighboring the second pixel in the second pixel array in the first vertical direction is connected to the fourth horizontal signal line.

9. The device of claim 8, wherein the first pixel of the first pixel array and the second pixel of the second pixel array have a second color.

10. The device of claim 9, wherein the third pixel of the second pixel array and the fourth pixel of the first pixel array have a third color.

11. The device of claim 10, wherein the third pixel of the first pixel array and the fourth pixel of the second pixel array have the first color.

12. The device of claim 1, wherein for any one horizontal signal line all of the pixel electrodes connecting the horizontal signal line to the pixels have the same location with respect to each of the connected pixels.

13. The device of claim 1, wherein a location of the pixel electrodes with respect to the pixels in a first pixel array is a mirror image of a location of the pixel electrodes with respect to the pixels in a second pixel array that is in the same row as and that is adjacent to the first pixel array.

14. The device of claim 1, wherein each horizontal signal line is connected to a first set of two adjacent pixels in first and second horizontally adjacent pixel arrays, is not connected to a second set of two adjacent pixels in the second and a third horizontally adjacent pixel arrays, and is connected to a third set of two adjacent pixels in the third and a fourth set of horizontally adjacent pixel arrays.

15. The device of claim 1, wherein the pixel arrays each include four pixels, wherein the four pixels within each pixel array are arranged in a two by two array.

16. The device of claim 15, wherein the pixel arrays comprise Bayer arrays.

17. The device of claim 16, wherein color filters of the Bayer arrays follow the same pattern for each of the Bayer arrays.

18. The device of claim 17, wherein each horizontal signal line is connected to pixels associated with two different color filters.

* * * * *